(12) United States Patent
Seder et al.

(10) Patent No.: US 12,399,380 B2
(45) Date of Patent: Aug. 26, 2025

(54) CAMPFIRE DISPLAY WITH AUGMENTED REALITY DISPLAY

(71) Applicant: GM Global Technology Operations LLC, Detroit, MI (US)

(72) Inventors: Thomas A. Seder, Fraser, MI (US); Joseph F. Szczerba, Grand Blanc, MI (US); John P. Weiss, Shelby Township, MI (US)

( * ) Notice: Subject to any disclaimer, the term of this patent is extended or adjusted under 35 U.S.C. 154(b) by 434 days.

(21) Appl. No.: 18/153,779

(22) Filed: Jan. 12, 2023

(65) Prior Publication Data
US 2024/0241391 A1    Jul. 18, 2024

(51) Int. Cl.
| | | |
|---|---|---|
| G02B 30/56 | (2020.01) | |
| B60K 35/00 | (2006.01) | |
| G06F 3/01 | (2006.01) | |
| G06Q 30/0601 | (2023.01) | |
| B60K 35/28 | (2024.01) | |

(52) U.S. Cl.
CPC .............. *G02B 30/56* (2020.01); *B60K 35/00* (2013.01); *G06F 3/012* (2013.01); *G06F 3/013* (2013.01); *G06F 3/017* (2013.01); *G06Q 30/0631* (2013.01); *B60K 35/28* (2024.01); *B60K 2360/177* (2024.01); *B60K 2360/334* (2024.01)

(58) Field of Classification Search
CPC ........ G02B 30/56; G02B 30/40; B60K 35/00; G06F 3/012; G06F 3/017
See application file for complete search history.

(56) References Cited

U.S. PATENT DOCUMENTS

| | | | |
|---|---|---|---|
| 10,318,043 B2 | 6/2019 | Seder et al. | |
| 11,077,844 B2 | 8/2021 | Szczerba | |
| 2010/0046050 A1 | 2/2010 | Kroll et al. | |
| 2011/0002038 A1* | 1/2011 | Wang | H04N 13/388 |
| | | | 359/479 |
| 2013/0100527 A1 | 4/2013 | Chung et al. | |
| 2013/0321776 A1 | 12/2013 | Loong et al. | |
| 2017/0322513 A1 | 11/2017 | Zapanta | |
| 2018/0147985 A1 | 5/2018 | Brown et al. | |
| 2019/0243151 A1 | 8/2019 | Hansen | |
| 2021/0023948 A1 | 1/2021 | Knittl et al. | |

(Continued)

OTHER PUBLICATIONS

U.S. Appl. No. 17/749,464 to Seder et al., filed May 20, 2022.
(Continued)

*Primary Examiner* — Ryan D Howard
(74) *Attorney, Agent, or Firm* — Vivacqua Crane, PLLC

(57) ABSTRACT

A method of using a system for generating a centrally located floating image display includes displaying a first image with a first display, receiving the first image with a first reflector, reflecting the first image with the first reflector, displaying a second image with a second display, receiving the second image with a second reflector, reflecting the second image with the second reflector, displaying first private information to the first passenger and second private information to the second passenger with a transparent display positioned between the first passenger and the first reflector and between the second passenger and the second reflector, receiving input from the first and second passengers with the system controller, collecting images with an external scene camera, and displaying general information with an augmented reality display.

20 Claims, 9 Drawing Sheets

(56) References Cited

U.S. PATENT DOCUMENTS

2023/0039608 A1 2/2023 Ji et al.
2023/0375829 A1 11/2023 Seder et al.

OTHER PUBLICATIONS

U.S. Appl. No. 17/746,243 to Chang et al., filed May 17, 2022.
U.S. Appl. No. 17/824,210 to Sharma et al., filed May 25, 2022.
U.S. Appl. No. 17/842,253 to Chang et al., filed Jun. 16, 2022.
U.S. Appl. No. 17/842,272 to Seder et al., filed Jun. 16, 2022.
U.S. Appl. No. 17/888,767 to Sharma et al., filed Aug. 16, 2022.

* cited by examiner

CAMPFIRE DISPLAY WITH AUGMENTED REALITY DISPLAY

INTRODUCTION

The present disclosure relates to a system for generating a floating image viewable by a plurality of passengers within a vehicle.

Current entertainment systems within vehicles generally comprise a screen or monitor that is mounted within the vehicle for viewing by the passengers. Some systems include smaller individual screens, wherein each passenger has a screen for their personal viewing. Current systems that provide virtual holographic images do not include the ability for annotation and for information that cannot be embedded within the virtual holographic image to be presented with the virtual holographic image. In addition, current systems do not include tactile properties that allow a passenger to interact with the virtual holographic image, such as by making selections or choosing different images to view. Known systems incorporate inverse head-up-display architectures that use beams splitters that must be attached to structure within the vehicle compartment and must be constantly re-adjusted to accommodate height and position variations of the passengers within the vehicle compartment.

While current systems achieve their intended purpose, there is a need for a new and improved system for providing a floating three-dimensional image that appears centrally located within the vehicle to all the passengers within the vehicle.

SUMMARY

According to several aspects of the present disclosure, a method of using a system for generating a centrally located floating three-dimensional image display for a plurality of passengers positioned within a vehicle compartment, includes displaying, with a first display of an image chamber in communication with a system controller, a first image, receiving, with a first reflector individually associated with a first passenger, the first image from the first display, reflecting, with the first reflector, the first image to the first passenger, wherein the first passenger perceives the first image floating at a central location within the image chamber, displaying, with a second display of the image chamber in communication with a system controller, a second image, receiving, with a second reflector individually associated with a second passenger, the second image from the second display, reflecting, with the second reflector, the second image to the second passenger, wherein the second passenger perceives the second image floating at the central location within the image chamber, displaying, with a transparent display in communication with the system controller and positioned between eyes of the first passenger and the first reflector and between the eyes of the second passenger and the second reflector, first private information to the first passenger within an image plane positioned in front of the first image floating at the central location within the image chamber and second private information to the second passenger within an image plane positioned in front of the second image floating at the central location within the image chamber, receiving, with the system controller, input from the first passenger and the second passenger, collecting, with an external scene camera, images of an external environment outside the vehicle compartment, and displaying, with an augmented reality display in communication with the system controller and positioned within the vehicle compartment remotely from the image chamber, general information related to at least one of the first image, the second image, the first and second private information displayed on the transparent display and the input received from the first passenger and the second passenger.

According to another aspect, the augmented reality display includes a transparent substrate, having light emitting particles dispersed therein, positioned on a window within the vehicle compartment, the displaying, with the augmented reality display positioned within the vehicle compartment remotely from the image chamber, general information related to the first image, the private information displayed on the transparent display and the input received from the first passenger including, generating, with a primary graphic projection device in communication with the system controller, a first set of images upon the window within the vehicle compartment based on visible light, wherein the first set of images are displayed upon a primary area of the window, generating, with a secondary graphic projection device in communication with the system controller, a second set of images upon a secondary area of the window based on an excitation light, wherein the light emitting particles in the windscreen emit visible light in response to absorbing the excitation light, and wherein the first set of images displayed upon the primary area of the windscreen cooperate with the second set of images displayed upon the secondary area of the windscreen to create an edge-to-edge augmented reality image.

According to another aspect, the receiving, with the system controller, input from the first passenger and the second passenger, further includes, receiving, with the system controller, via the transparent display, input from the first passenger and the second passenger, receiving, with the system controller, via at least one first sensor, input comprising a position of a head and eyes of the first passenger, receiving, with the system controller, via at least one first gesture sensor, information related to gestures made by the first passenger, collecting, with the system controller, via a first microphone, audio input from the first passenger, and collecting, with the system controller, via a second microphone, audio input from the second passenger, and the method further including, broadcasting, with the system controller, via a first zonal speaker, audio output for the first passenger, and broadcasting, with the system controller, via a second zonal speaker, audio output for the second passenger.

According to another aspect, the system is adapted to support interactive gaming between the first passenger and a remote opponent, the method further including, within the first image, an image of the remote opponent, including, within the first private information displayed to the first passenger on the transparent display, game information, and including, within the general information displayed on the augmented reality display, gameplay action.

According to another aspect, the method further includes capturing, with an internal scene camera mounted within the vehicle compartment and in communication with the system controller, images of the augmented reality display, and sending, with the system controller, images of the augmented reality display to the remote opponent.

According to another aspect, the method further includes receiving, with the system controller, via the at least one first sensor, input comprising a position of a head and eyes of the first passenger, receiving, with the system controller, via the at least one first gesture sensor, information related to gestures made by the first passenger, and sending, with the system controller, input from the first passenger collected by the transparent display, the at least one first sensor and the at least one gesture sensor to a game system for incorporation into gameplay action.

According to another aspect, the method further includes supporting communication between the first passenger and the remote opponent with the first microphone and the first zonal speaker.

According to another aspect, the system is adapted to support a personalized driving tour for the plurality of passengers positioned within the vehicle compartment, the method including collecting, with the system controller, information related to a first pre-determined site and a second pre-determined site located along a pre-determined path of a driving tour, collecting, with the system controller, information related to the first passenger and the second passenger, identifying, with the system controller, at least one first point of interest located between the first pre-determined site and the second pre-determined site and relevant to the first passenger and collecting information related to the at least one first point of interest, identifying, with the system controller, at least one second point of interest located between the first pre-determined site and the second pre-determined site and relevant to the second passenger and collecting information related to the at least one second point of interest, and, when stopped at the first pre-determined site and when traveling between the first pre-determined site and the second pre-determined site, and when stopped at the second pre-determined site, including, with the system controller, the information related to the at least one first point of interest within the first image and including, with the system controller, the information related to the at least one second point of interest within the second image.

According to another aspect, the method further includes, when stopped at the first pre-determined site, including, with the system controller, information related to the first pre-determined site within the general information displayed by the augmented reality display.

According to another aspect, the method further includes, with the system controller, receiving, via the first microphone, a command from the first passenger, receiving, via the at least one first sensor and the at least one first gesture sensor data related to gestures made by the first passenger and the direction of a gaze of the first passenger, identifying, based on the data related to gestures made by the first passenger, the direction of the gaze of the first passenger and images of the external environment outside the vehicle compartment, an object outside of the vehicle compartment that the first passenger is looking at through the window with the augmented reality display, highlighting the object within the augmented reality display, and supporting, with the system controller, via the transparent display, interaction, by the first passenger, with the first image.

According to another aspect, when the system controller determines that the object is a permanent object, the method includes collecting information, with the system controller, from remote data sources, related to the object, and including, within the first private information, textual information related to the object.

According to another aspect, when the system controller determines that the object is a non-permanent object, the method includes identifying the object with object identification algorithms within the system controller, including, within the first private information, textual information related to the object.

According to another aspect, the method further includes collecting, with the system controller, from remote data sources, information related to shopping interests of the first passenger, identifying an item that the first passenger may be interested in purchasing based on the information related to shopping interest of the first passenger, identifying, with the system controller, retailers that sell the item and are located one of, within a pre-determined distance, and located on a pre-determined route, collecting, with the system controller, from identified retailers, quantity and pricing information about the item, and including, within the first private information, the information related to retailers that sell the item, quantity and pricing if the item.

According to another aspect, the method further includes receiving, with the system controller, via the transparent display, input from the first passenger expressing interest in the item, including, within the first image, an image of the item, and highlighting, within the augmented reality display, an identified retailer, when an identified retailer is visible through the window and the augmented reality display.

According to another aspect, the method further includes receiving, via the transparent display, input from the first passenger including augmentations to the first image, receiving, with the system controller, from the first passenger, input indicating that the first passenger is finished and wants to display the first image and the augmentations within the augmented reality display, and including, within the general information displayed on the augmented reality display, the first image and augmentations by the first passenger.

According to another aspect, the method further includes receiving, from the first passenger, input on a destination, including, in the second private information displayed on the transparent display for the second passenger, information about the destination, and highlighting, within the augmented reality display, the destination when the destination is visible through the window and the augmented reality display.

According to several aspects of the present disclosure, a system for generating a centrally located floating three-dimensional image display for a plurality of passengers positioned within a vehicle compartment within a vehicle includes a system controller, an image chamber including a first display adapted to project a first image, a first reflector individually associated with the first display and a first one of the plurality of passengers, the first reflector adapted to receive the first image from the first display and to reflect the first image to the first passenger, wherein the first passenger perceives the first image floating at a central location within the image chamber, a second display adapted to project a second image, and a second reflector individually associated with the second display and a second one of the plurality of passengers, the second reflector adapted to receive the second image from the second display and to reflect the second image to the second passenger, wherein, the second passenger perceives the second image floating at the central location within the image chamber, and a transparent touch screen display positioned between the first reflector and the first passenger and between the second reflector and the second passenger and adapted to display first private information to the first passenger within an image plane positioned in front of the first image floating at the central location within the image chamber and to receive input from the first passenger, and adapted to display second private information to the second passenger within an image plane positioned in front of the second image floating at the central location within the image chamber and to receive input from the second passenger, an external scene camera adapted to collect images of an external environment outside the vehicle compartment, an augmented reality display positioned within the vehicle compartment remotely from the image chamber and adapted to display general information related to at least one of the first image, first and second private information displayed on the transparent display and input received from the first and second passengers, and an internal scene camera mounted within the vehicle compartment and in communication with the system controller and adapted to capture images of the augmented reality display.

According to another aspect, the augmented reality display includes a transparent substrate, having light emitting particles dispersed therein, positioned on a window within the vehicle compartment, a primary graphic projection device for generating a first set of images upon the window of the vehicle based on visible light, wherein the first set of images are displayed upon a primary area of the window, a secondary graphic projection device for generating a second set of images upon a secondary area the window of the vehicle based on an excitation light, wherein the light emitting particles in the window emit visible light in response to absorbing the excitation light, and wherein the first set of images displayed upon the primary area of the window cooperate with the second set of images displayed upon the secondary area of the window to create an edge-to-edge augmented reality view of a surrounding environment of the vehicle, a primary graphics processing unit in electronic communication with the primary graphic projection device and the system controller, and a secondary graphics processing unit in electronic communication with the secondary graphic projection device and the system controller.

According to another aspect, the system is selectively moveable vertically up and down along a vertical central axis, the first display and the first reflector are unitarily and selectively rotatable about the vertical central axis, and the second display and the second reflector are unitarily and selectively rotatable about the vertical central axis, the system further including first sensors adapted to monitor a position of a head and eyes of the first passenger, wherein, the first display and first reflector are adapted to rotate in response to movement of the head and eyes of the first passenger, and second sensors adapted to monitor a position of a head and eyes of the second passenger, wherein, the second display and the second reflector are adapted to rotate in response to movement of the head and eyes of the second passenger, the system adapted to move up and down along the vertical axis in response to movement of the head and eyes of the first passenger and movement of the head and eyes of the second passenger, and a first gesture sensor adapted to gather information related to gestures made by the first passenger, and a second gesture sensor adapted to gather information related to gestures made by the second passenger, wherein, the system is adapted to receive input from the first and second passengers via data collected by the first and second gesture sensors.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
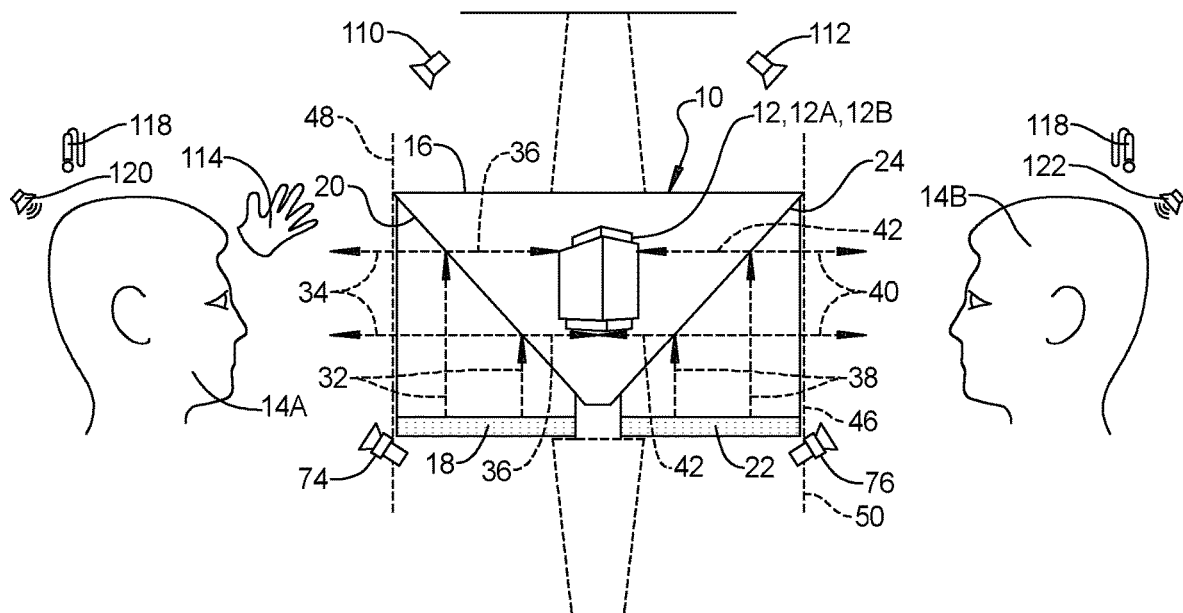
FIG. 1 is a schematic side view of a system in accordance with an exemplary embodiment of the present disclosure.

The figures are not necessarily to scale, and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 2:
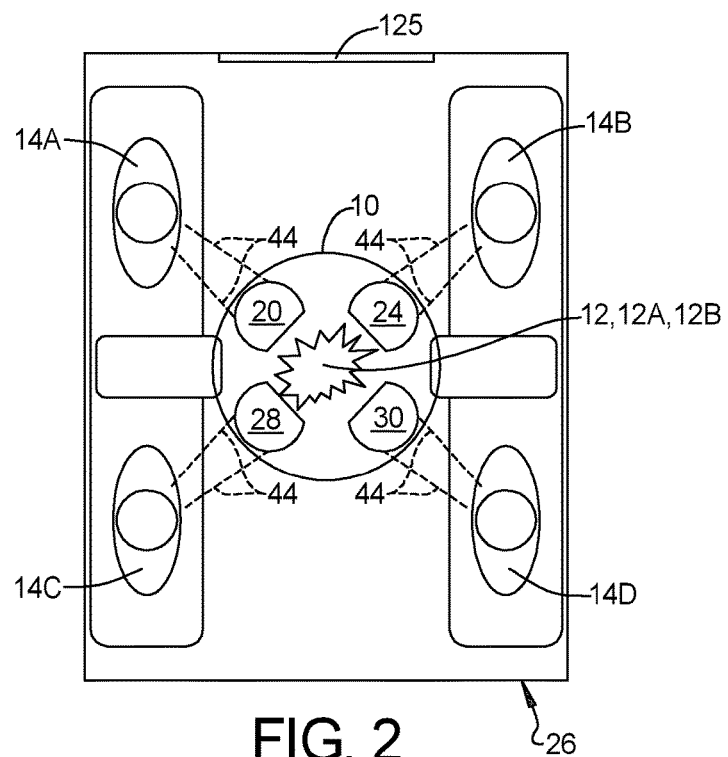
FIG. 2 is a schematic top view of a vehicle compartment having a system in accordance with an exemplary embodiment of the present disclosure.

Referring to FIG. 1 and FIG. 2, a system 10 for generating a centrally located floating three-dimensional image 12 display for a plurality of passengers 14 positioned within a vehicle, includes an image chamber 16 that includes a first display 18 in communication with a system controller 19 and is adapted to project a first three-dimensional image 12A and a first reflector 20 individually associated with the first display 18 and a first one 14A of the plurality of passengers 14, and a second display 22 that is adapted to project a second three-dimensional image 12B and a second reflector 24 individually associated with the second display 22 and a second one 14B of the plurality of passengers 14. As shown in FIG. 1, the system 10 includes two displays 18, 22, reflectors 20, 24 and passengers 14A, 14B. It should be understood that the system 10 may be adapted to accommodate any suitable number of passengers 14.

The system controller 19 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Referring to FIG. 2, a vehicle compartment 26 includes a plurality of seating positions occupied by a plurality of passengers 14A, 14B, 14C, 14D. As shown, the vehicle compartment 26 includes four seating positions for four passengers 14A, 14B, 14C, 14D. Each reflector 20, 24, 28, 30 is adapted to be viewed by one of the passengers 14A, 14B, 14C, 14D. Each reflector 20, 24, 28, 30 is adapted to receive an image from the associated display 18, 22, and to reflect the image to the associated passenger 14. The associated passenger 14 perceives the image 12 floating at a central location within the image chamber 16. Referring again to FIG. 1, the first reflector 20 is adapted to receive the first image 12A from the first display 18, as indicated by arrows 32, and to reflect the first image 12A to the first passenger 14A, as indicated by arrows 34, wherein the first passenger 14A perceives the first image 12A floating at a central location within the image chamber 16, as indicated by arrows 36. The second reflector 24 is adapted to receive the second image 12B from the second display 22, as indicated by arrows 38, and to reflect the second image 12B to the second passenger 14B, as indicated by arrows 40, wherein, the second passenger 14B perceives the second image 12B floating at the central location within the image chamber 16, as indicated by arrows 42.

Referring to FIG. 2, each of the four passengers 14A, 14B, 14C, 14D perceives an image 12 reflected to them by respective associated reflectors 20, 24, 28, 30 and the passengers 14A, 14B, 14C, 14D perceive the image 12 reflected to them within the image chamber 16, as indicated by lines 44. Each of the displays 18, 22 can project the same image to each of the reflectors 20, 24, 28, 30 and thus to each of the passengers 14A, 14B, 14C, 14D. Alternatively, each of the displays 18, 22 can display a different perspective of the same image, or a different image altogether to each of the reflectors 20, 24, 28, 30. Thus the system 10 is capable of presenting the same floating image 12 to all the passengers 14 so they can view simultaneously, or alternatively, each passenger 14 can view a different perspective of the floating image 12 or a completely different three-dimensional image 12.

A transparent display 46 is positioned between the eyes of each of the plurality of passengers 14 and the reflectors 20, 24, 28, 30. As shown in FIG. 1, the transparent display 46 is positioned between the first reflector 20 and the first passenger 14A and between the second reflector 24 and the second passenger 14B. The transparent display 46 is adapted to display information to the first and second passengers 14A, 14B within an image plane positioned in front of the perceived first and second images 12A, 12B floating at the central location within the image chamber 16. The transparent display 46 presents first private information to the first passenger 14A that appears within a first image plane 48, wherein the first private information displayed on the transparent display 46 to the first passenger 14A appears in front of the image 12A perceived by the first passenger 14A within the image chamber 16. The first private information is information meant to be seen only by the first passenger 14A. The transparent display 46 presents second private information to the second passenger 14B that appears within a second image plane 50, wherein second private information displayed on the transparent display 46 to the second passenger 14B appears in front of the image 12B perceived by the second passenger 14B within the image chamber 16. The second private information is information meant to be seen only by the second passenger 14B.

In an exemplary embodiment, the transparent display 46 is a transparent touch screen that is adapted to allow the plurality of passengers 14 to receive annotated information and to provide input to the system 10. Referring to FIG. 1 and FIG. 2, in an exemplary embodiment, the transparent display 46 includes a clear cylindrical touch screen. The clear cylindrical touch screen encircles the image chamber 16 and is thereby positioned between the eyes of the plurality of passengers 14 and the perceived image 12 floating at the central location within the image chamber 16. In an exemplary embodiment, the transparent display 46 is an organic light-emitting diode (OLED). It should be understood, that the transparent display 46 may be other types of transparent touch screen displays known in the art.

The transparent display 46 is adapted to present visible displayed information only to the passenger 14 that is directly in front of a portion of the transparent display 46. The nature of the transparent display 46 is such that the displayed information is only displayed on a first side, the outward facing cylindrical surface, of the transparent display 46. A second side, the inward facing cylindrical surface, of the transparent display 46 does not display information, and thus, when viewed by the other passengers 14, allows the other passengers 14 to see through the transparent display 46.

In an exemplary embodiment, the images from each of the displays 18, 22 are generated via holographic method, pre-computed and encoded into a hologram generator within the display 18, 22. In an exemplary embodiment, each display 18, 22 is adapted to project a three-dimensional image with variable virtual image distance. Three-dimensional images with variable virtual image distance allows the system 10 to project a floating image 12 to the passengers 14 with the capability of making the floating image 12 appear closer or further away from the passengers 14.

Referring again to FIG. 1, in an exemplary embodiment, the system is mounted to a support structure suspended from a roof 29 within the vehicle compartment 26. Alternatively, in another exemplary embodiment, the system is mounted to a support structure, such as a pedestal, mounted to a floor 31 within the vehicle compartment 26. In various embodiments, the system bay be retractable, wherein, when not in use, the system recesses within the roof 29 or the floor 31 within the vehicle compartment.

The transparent display 46 and each of the reflectors 20, 24, 28, 30 are transparent, wherein a passenger 14 can see through the transparent display 46 and an associated reflector 20, 24, 28, 30. This allows the passenger 14 to perceive the floating image 12 at a distance beyond the reflector 20, 24, 28, 30 and further, allows the passenger 14 to see through the transparent display 46 and the reflectors 20, 24, 28, 30 and able to see the interior of the vehicle compartment 26 and other passengers 14 therein.

In one exemplary embodiment, the transparent display 46 is an autostereoscopic display that is adapted to display stereoscopic, or three-dimensional images by adding binocular perception of three-dimensional depth without the use of special headgear, glasses, something that affects the viewer's vision, or anything for the viewer's eyes. Because headgear is not required, autostereoscopic displays are also referred to as "glasses-free 3D" or "glassesless 3D". The autostereoscopic transparent display includes a display panel and a parallax barrier mounted to the display panel, on an outwardly facing side of the display panel facing an associated one of the plurality of passengers 14. In an exemplary embodiment the parallax barrier that is mounted onto the transparent display 46 includes a plurality of parallel, vertical apertures, that divide the image displayed such that a left eye and a right eye of a passenger 14 viewing the autostereoscopic display see different portions of the displayed image and the passenger 14 perceives a three-dimensional image.

In an exemplary embodiment, the parallax barrier that is mounted onto the transparent display 46 is selectively actuatable by a controller adapted to switch between having the parallax barrier off, wherein the parallax barrier is completely transparent, and the viewing passenger 14 sees images displayed on the transparent display 46 as two-dimensional images, and having the parallax barrier on, wherein the viewing passenger 14 sees the images displayed on the transparent display 46 as a three-dimensional images.

When the parallax barrier is actuated, each of the left and right eyes of the viewing passenger 14 only see half of the displayed image, therefore, the resolution of the three-dimensional image is reduced. To improve resolution, in one exemplary embodiment, the controller is configured to implement time-multiplexing by alternately turning the parallax barrier on and off. Time-multiplexing requires the system 10 to be capable of switching the parallax barrier on and off fast enough to eliminate any perceptible image flicker by the viewing passenger 14. Liquid crystal displays are particularly suitable for such an application.

Figure 4:
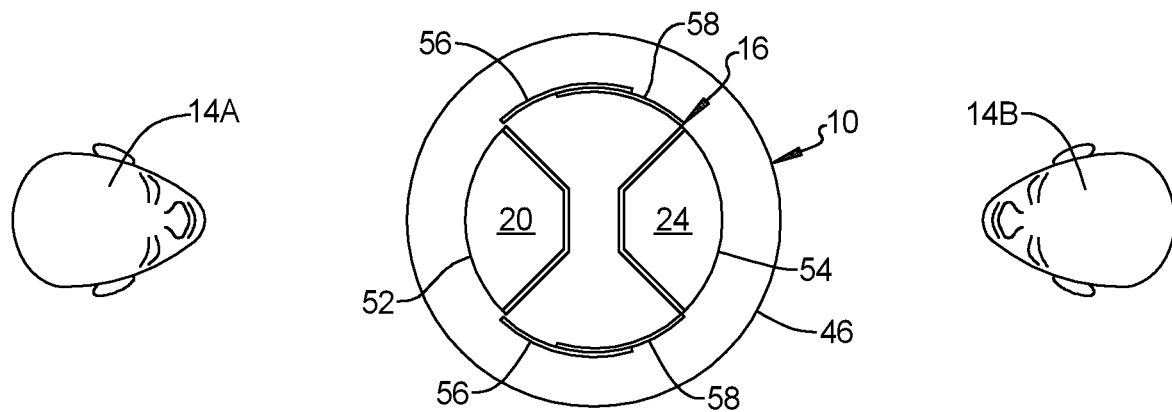
FIG. 4 is a schematic top view of the system shown in FIG. 1 with a first and second passenger.

Referring to FIG. 4, the image chamber 16 includes transparent portions 52, 54 to allow the passengers 14 to see their associated reflector 20, 24, 28, 30. As shown, the image chamber 16 includes a first transparent portion 52 that is adapted to allow the first image 12A reflected by the first reflector 20 to pass from the image chamber 16 outward toward the first passenger 14A, as indicated by arrows 34 in FIG. 1. Further, the image chamber 16 includes a second transparent portion 54 that is adapted to allow the second image 14B reflected by the second reflector 24 to pass from the image chamber 16 outward toward the second passenger 14B, as indicated by arrows 40 in FIG. 1.

The image chamber 16 further includes solid portions 56, 58 that are adapted to prevent light from entering the image chamber 16 behind the first and second reflectors 20, 24. The image chamber 16 functions much like a Pepper's Ghost Chamber, wherein the image of an object is perceived by a viewer within a reflective surface adjacent the actual image. As discussed above, in the present disclosure, the image presented by a display 18, 22 which is not within view of a passenger 14, is reflected by a reflector 20, 24, 28, 30 to the passenger 14A, 14B, 14C, 14D such that the passenger "sees" the image within the image chamber 16 and perceives the image 12 to be floating behind the reflective surface of the reflector 20, 24, 28, 30. If the image chamber 16 behind the reflectors 20, 24, 28, 30 is exposed to ambient light, the image will not be viewable by the passengers 14. Thus, solid portions 56, 58 of the image chamber 16 are adapted to prevent light from entering the image chamber 16 behind the first and second reflectors 20, 24. Referring to FIG. 4, the image chamber 16 includes solid overlapping panels 56, 58 that are adapted to prevent light from entering the image chamber 16 behind the first and second reflectors 20, 24.

Figure 5:
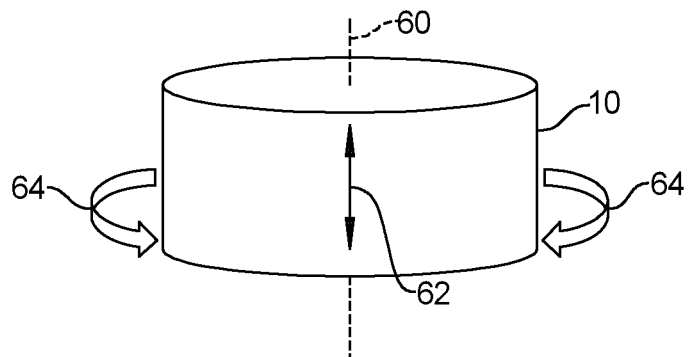
FIG. 5 is a schematic perspective view of the system shown in FIG. 1.

Referring to FIG. 5, in an exemplary embodiment, the system 10 is selectively moveable vertically up and down along a vertical central axis 60, as indicated by arrow 62. Further, each display 18, 22 and the associated reflector 20, 24, 28, 30 are unitarily and selectively rotatable about the vertical central axis 60, as shown by arrows 64. This allows the system 10 to adjust to varying locations of the passengers 14 within the vehicle compartment 26.

Figure 6:
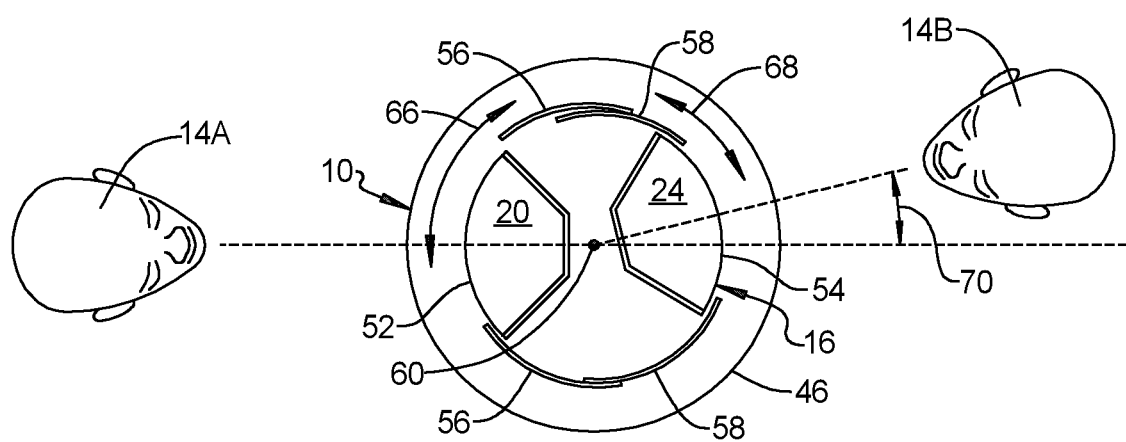
FIG. 6 is a schematic top view of the system shown in FIG. 3, wherein the position of the second passenger has moved.

Referring to FIG. 6, the first reflector 20 and the first display 18 are rotatable about the vertical central axis 60, as indicated by arrow 66. The second reflector 24 and the second display 22 are rotatable about the vertical central axis 60, as indicated by arrow 68. As shown in FIG. 4, the first and second passengers 14A, 14B are sitting directly across from one another, and the first reflector 20 and first display 18 are positioned 180 degrees from the second reflector 24 and second display 22. As shown in FIG. 6, the position of the head of the second passenger 14B has moved, and the second reflector 24 and the second display 22 have been rotated an angular distance 70 to ensure the second passenger 14B perceives the image 12 from the second display 22 and the second reflector 24.

In an exemplary embodiment, the image chamber 16 includes first solid panels 56 positioned adjacent the first reflector 20 on either side and adapted to move unitarily with the first reflector 20 and the first display 18 as the first reflector 20 and the first display 18 rotate about the vertical central axis 60. Second solid panels 58 are positioned adjacent the second reflector 24 on either side and are adapted to move unitarily with the second reflector 24 and the second display 22 as the second reflector 24 and the second display 22 rotate about the vertical central axis 60. The first solid panels 56 overlap the second solid panels 58 to allow relative movement of the first solid panels 56 relative to the second solid panels 58 and to ensure that ambient light is blocked from entering the image chamber 16 behind the first and second reflectors 20, 24 at all times.

In an exemplary embodiment, each of the displays 18, 22 and associated reflectors 20, 24, 28, 30 are equipped with head tracking capability, wherein an orientation of each display 18, 22 and associated reflector 20, 24, 28, 30 changes automatically in response to movement of a head and eyes of a passenger 14 detected by a monitoring system 72. Monitoring systems 72 within a vehicle include sensors 74 that monitor head and eye movement of a driver/passenger within the vehicle.

In an exemplary embodiment, the system 10 includes at least one first sensor 74 adapted to monitor a position of a head and eyes of the first passenger 14A. The at least one first sensor 74 may include camera and motion sensors adapted to detect the position and movement of the first passenger's head and eyes. As shown, the first sensors 74 include a camera oriented to monitor the position and movement of the head and eyes of the first passenger 14A. The first display 18 and first reflector 20 are adapted to rotate in response to movement of the head and eyes of the first passenger 14A. The system 10 further includes at least one second sensor 76 adapted to monitor a position of a head and eyes of the second passenger 14B. The at least one second sensor 76 may include camera and motion sensors adapted to detect the position and movement of a passenger's head and eyes. As shown, the second sensors 76 include a camera oriented to monitor the position and movement of the head and eyes of the second passenger 14B. The second display 22 and second reflector 24 are adapted to rotate about the vertical central axis 60 in response to movement of the head and eyes of the second passenger 14B.

Figure 3:
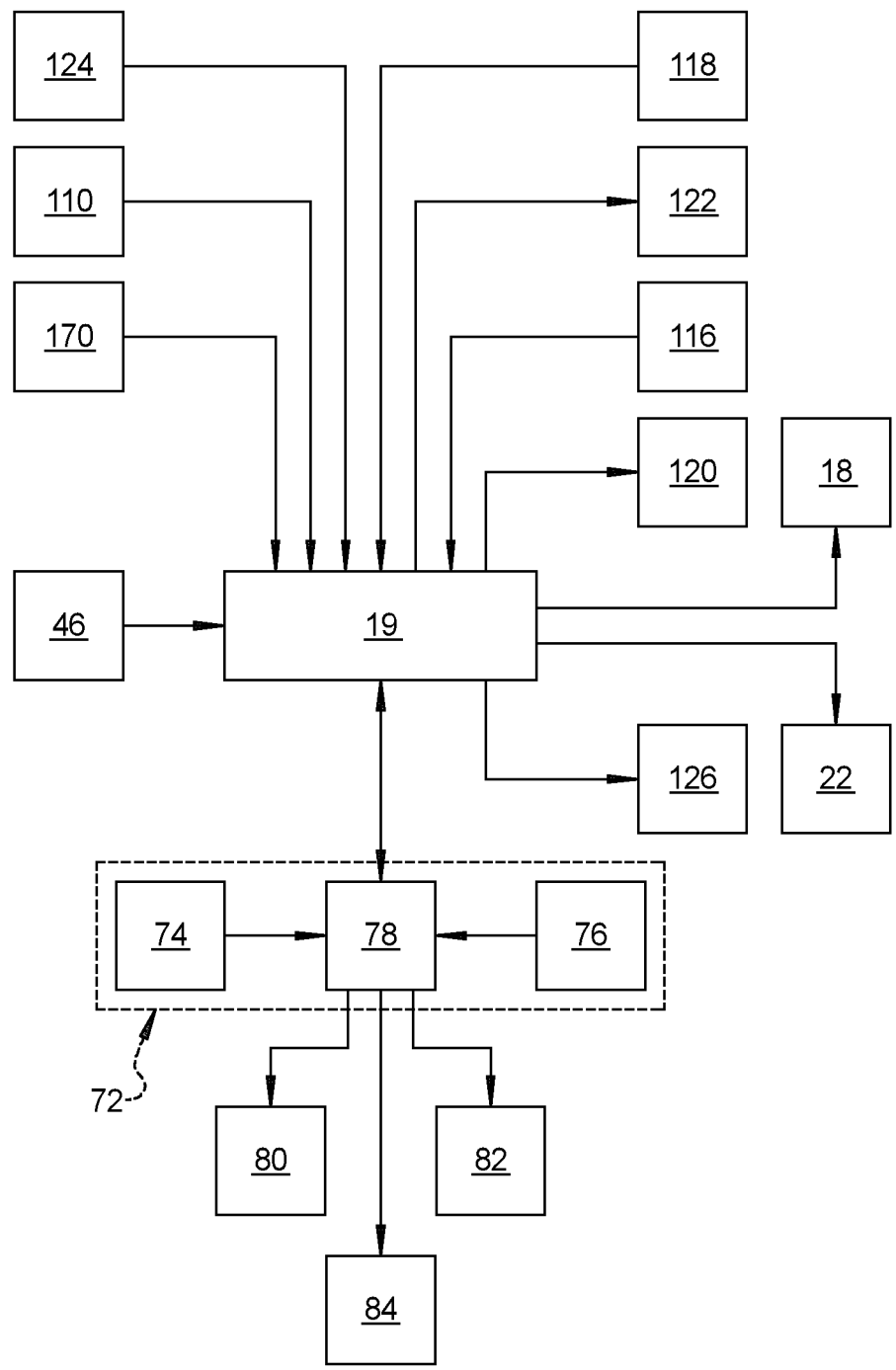
FIG. 3 is a schematic diagram of the system shown in FIG. 1.

Referring again to FIG. 3, a controller 78 of the monitoring system 72 is in communication with the system controller 19 and receives information from the first sensors 74, and in response to detection of head/eye movement by the first passenger 14A, actuates a first motor 80 adapted to rotate the first reflector 20 and first display 18 about the vertical central axis 60. Further, the controller 78 of the monitoring system 72 receives information from the second sensors 76, and in response to detection of head/eye movement by the second passenger 14B, actuates a second motor 82 adapted to rotate the second reflector 24 and second display 22 about the vertical central axis 60.

In addition to rotation of the first display 18 and first reflector 20 and the second display 22 and second reflector 24, the system 10 is adapted to move up and down along the vertical central axis 60 in response to movement of the head and eyes of the first passenger 14A and movement of the head and eyes of the second passenger 14B. The controller 78 of the monitoring system 72 receives information from the first sensors 74 and the second sensors 76, and in response to detection of head/eye movement by the first and second passengers 14A, 14B, actuates a third motor 84 adapted to raise and lower the system 10 along the vertical central axis 60 to maintain optimal vertical position of the system 10 relative to the passengers 14. Preferences may be set within the system 10 such that the system 10 maintains optimal vertical positioning relative to a designated one of the plurality of passengers 14, or alternatively, preferences can be set such that the system 10 maintains a vertical position taking into consideration some or all of the plurality of passengers 14.

In an exemplary embodiment, the monitoring system 72 is adapted to monitor the position of a head and eyes of each one of the plurality of passengers 14, wherein, for each of the plurality of passengers 14, the system 10 is adapted to display information at a specific location on the transparent display 46 based on a position of the head and eyes of the passenger 14. In another exemplary embodiment, for each of the plurality of passengers 14, the system 10 is adapted to display information at a specific location on the transparent display 46 based on the position of the head and eyes of the passenger 14 relative to the perceived image 12 within the image chamber 16, such that, for each of the plurality of passengers 14, information displayed on the transparent display 46 is properly positioned relative to the perceived image 12 within the image chamber 16.

Figure 7:
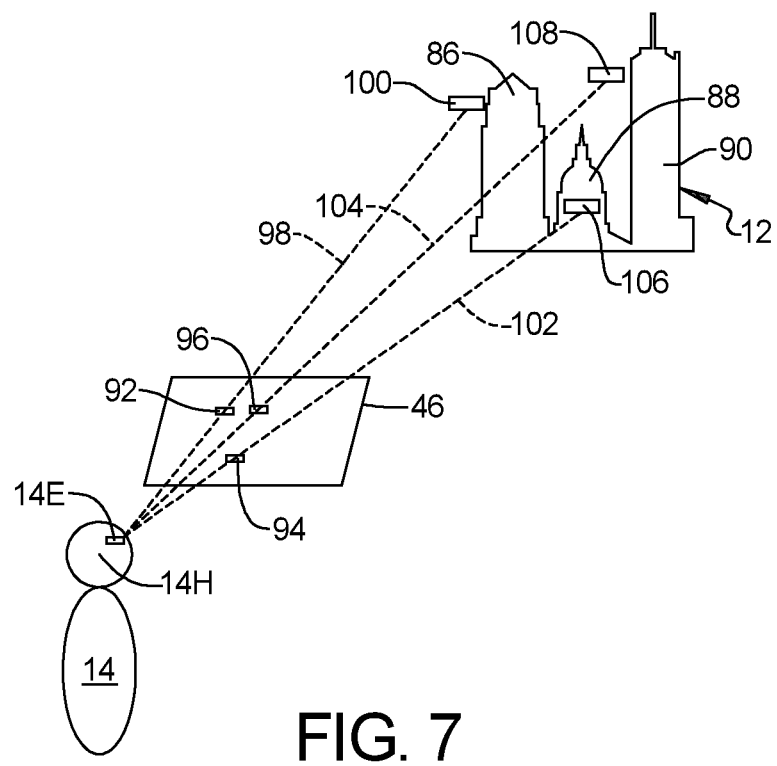
FIG. 7 is a schematic view illustrating a passenger viewing an image and annotation information through an associated beam splitter and passenger interface.

Referring to FIG. 7, in a schematic view of a passenger 14 an associated transparent display 46 and a floating image 12, the passenger 14 perceives the floating image 12 at a distance behind the transparent display 46. The transparent display 46 displays information related to the floating image 12 at a proper location on the transparent display 46 so the passenger 14 sees the information at a proper location relative to the floating image 12. As shown in FIG. 7, the floating image 12 is of a skyline, and more specifically, of three buildings, a first building 86, a second building 88, and a third building 90. The transparent display 46 displays first building information 92, second building information 94 and third building information 96.

The first building information 92 appears in a text box and may contain information about the first building 86 as well as the option of allowing the passenger 14 to touch the first building information 92 text box to acquire additional information about the first building 86. For example, the first building information 92 text box may contain the name of the first building 86 and the street address. The passenger 14 may opt to touch the first building information 92 text box, wherein additional information will appear on the transparent display 46, such as the date the first building 86 was built, what type of building (office, church, arena, etc.), or statistics such as height, capacity, etc. The second building information 94 and the third building information 96 also appear in text boxes that contain similar information and the option for the passenger 14 to touch the second or third building information 94, 96 text boxes to receive additional information about the second and third buildings 88, 90.

The monitoring system 72 tracks the position of the passenger's 14 head 14H and eyes 14E and positions the first, second and third building information 92, 94, 96 text boxes at a location on the transparent display 46, such that when the passenger 14 looks at the floating image 12 through the reflector 20, 24, 28, 30 and the transparent display 46, the passenger 14 sees the first, second and third building information 92, 94, 96 text boxes at the proper locations relative to the floating image 12. For example, the transparent display 46 positions the first building information 92 in the passenger's line of sight, as indicated by dashed line 98, such that the first building information 92 is perceived by the passenger 14 at a location immediately adjacent the first building 86, as indicated at 100. Correspondingly, the transparent display positions the second building information 94 in the passenger's line of sight, as indicated by dashed line 102, and the third building information 96 in the passenger's line of sight, as indicated by dashed line 104, such that the second and third building information 94, 96 is perceived by the passenger 14 at a location superimposed on the building, in the case of the second building 88, as indicated at 106, and at a location immediately adjacent the building, in the case of the third building 90, as indicated at 108.

The monitoring system 72 continuously tracks movement of the head 14H and eyes 14E of the passenger 14 and adjusts the position that the first, second and third building information 92, 94, 96 are displayed on the transparent display 46 to ensure that the passenger 14 always perceives the first, second and third building information 92, 94, 96 at the proper locations 100, 106, 108 relative to the floating image 12.

In an exemplary embodiment, the system 10 is adapted to accept input from a passenger 14 based solely on contact between the passenger 14 and the transparent display 46. For example, when a passenger 14 reaches out to touch a finger-tip to the transparent display 46, the transparent display 46 takes the input based solely on the point of contact between the tip of the finger of the passenger 14 and the transparent display 46.

In another exemplary embodiment, the system 10 is adapted to accept input from a passenger 14 based on contact between the passenger 14 and the transparent display 46 and based on the location of a point of contact between the passenger 14 and the transparent display 46 relative to the perceived image 12. For example, the monitoring system 72 tracks the movement and position of the passenger's 14 eyes 14E and head 14H. The transparent display 46 displays information that is perceived by the passenger 14 relative to the floating image 12, as discussed above. When the passenger 14 touches the transparent display 46, the passenger 14 perceives that they are touching the floating image 12. The system 10 uses parallax compensation to correlate the actual point of contact between the finger-tip of the passenger 14 on the transparent display 46 to the location on the floating image 12 that the passenger 14 perceives they are touching.

The system 10 may display, on the transparent display 46, multiple different blocks of annotated information relative to a floating image 12. As the passenger's 14 head 14H and eyes 14E move, the passenger's head 14H and eyes 14E will be positioned at a different distance and angle relative to the transparent display 46, thus changing the perceived location of displayed information relative to the image 12. By using parallax compensation techniques, such as disclosed in U.S. Pat. No. 10,318,043 to Seder, et al., hereby incorporated by reference herein, the system 10 ensures that when the passenger 14 touches the transparent display 46, the system 10 correctly identifies the intended piece of annotated information that the passenger 14 is selecting.

In another exemplary embodiment, the system 10 is adapted to accept input from a passenger 14 based on gestures made by the passenger 14 where the passenger 14 does not touch the transparent display 46. For example, when the passenger 14 moves a hand 114, or points to an object that is displayed on the transparent display 46 or to an object within the vehicle compartment 26 or outside of the vehicle compartment 26.

Referring again to FIG. 1, in an exemplary embodiment, the system includes at least one first gesture sensor 110 adapted to monitor position and movement of arms, hands and fingers 114 of the first passenger 14A and to gather data related to gestures made by the first passenger 14A. The first gesture sensor 110 may include a camera and motion sensors adapted to detect the position and movement of the first passenger's arms, hands and fingers. As shown, the first gesture sensor 110 includes a camera oriented to monitor the position and movement of the arms, hands and fingers of the first passenger 14A. Further, the system 10 includes a second gesture sensor 112 adapted to monitor position and movement of arms, hands and fingers of the second passenger 14B and to gather data related to gestures made by the second passenger 14B. The second gesture sensor 112 may include a camera and motion sensors adapted to detect the position and movement of the second passenger's arms, hands and fingers. As shown, the second gesture sensor 112 includes a camera oriented to monitor the position and movement of the arms, hands and fingers of the second passenger 14B.

The system 10 uses data collected by the first and second gesture sensors 110, 112 to identify gestures made by the passengers 14A, 14B within the vehicle compartment 26. A system controller will use computer learning algorithms and parallax compensation techniques to interpret such gestures and identify input data, such as when a passenger 14 is pointing to an object outside the vehicle compartment 26.

In another exemplary embodiment, the system 10 is adapted to accept audio input from passengers 14 within the vehicle compartment 26. Referring to FIG. 1, the system 10 includes a first microphone 116, in communication with the system controller 19, that is adapted to collect audio input from the first passenger 14A. Correspondingly, the system 10 includes a second microphone 118, in communication with the system controller 19, that is adapted to collect audio input from the second passenger 14B. The system controller 19 is adapted to recognize pre-determined commands from the passengers 14A, 14B within the vehicle compartment 26 when such commands are vocalized by the passengers 14A, 14B and picked-up by the first and second microphones 116, 118.

Further, the system 10 includes a first zonal speaker 120 adapted to broadcast audio output to the first passenger 14A. The first zonal speaker 120 is adapted to broadcast audio output in a manner such that only the first passenger 14A can hear and understand the audio output from the first zonal speaker 120. In this manner, audio information can be broadcast, by the system controller 19, to the first passenger 14A that is private to the first passenger 14A and does not disturb other passengers within the vehicle compartment 26. The system 10 includes a second zonal speaker 122 adapted to broadcast audio output to the second passenger 14B. The second zonal speaker 122 is adapted to broadcast audio output in a manner such that only the second passenger 14B can hear and understand the audio output from the second zonal speaker 122. In this manner, audio information can be broadcast, by the system controller 19, to the second passenger 14B that is private to the second passenger 14B and does not disturb other passengers within the vehicle compartment 26. The first and second zonal speakers 120, 122 may comprise speakers that are mounted within the vehicle compartment 26 and to broadcast audio output directionally to a specified location within the vehicle compartment 26. Further, the first and second zonal speakers 120, 122 may comprise a wireless headset or ear-bud adapted to be worn by the passengers 14A, 14B.

In an exemplary embodiment, the system 10 further includes an external scene camera 124 that is in communication with the system controller 19 and is adapted to capture images of an external environment outside the vehicle compartment 26. In this manner, the system controller 19 can collect data and "see" objects, locations, destinations and points of interest immediately outside the vehicle compartment 26.

The system 10 further includes an augmented reality display 125 positioned within the vehicle compartment 26 remotely from the image chamber 16 and adapted to display general information related to at least one of the first image 12A, first and second private information displayed on the transparent display 46 and input received from the first and second passengers 14A, 14B.

Figure 8:
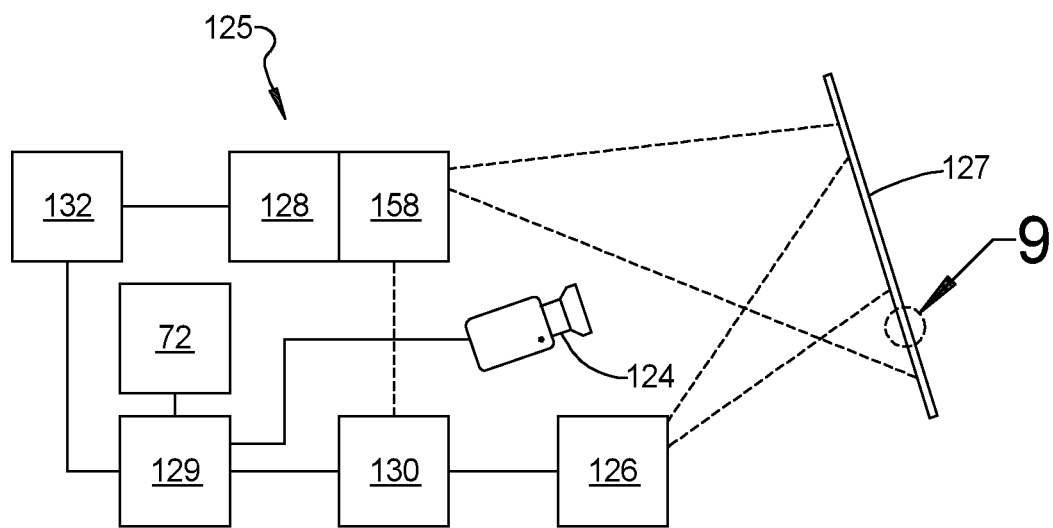
FIG. 8 is a schematic diagram of an augmented reality display in accordance with the present disclosure.
Figure 9:
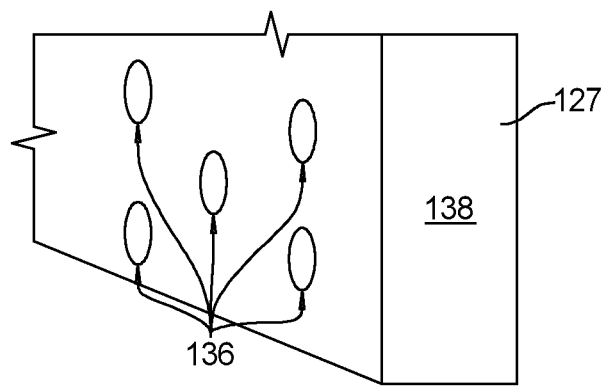
FIG. 9 is an enlarged view of a portion of FIG. 8, as indicated by the area labelled "FIG. 9" in FIG. 8.

Referring to FIG. 8 and FIG. 9, an augmented reality display 125 includes a transparent substrate 138 affixed to a window 127 within the vehicle compartment 26 and including light emitting particles 136 embedded therein. As explained below, the augmented reality display 125 includes a primary graphic projection device 126 and a secondary graphic projection device 128 that work together to provide an augmented reality experience for the passengers 14 within the vehicle compartment 26.

The augmented reality display 125 includes one or more controllers 129 in electronic communication with the system controller 19 and the external scene camera 124, the monitoring system 72, a primary graphics processing unit 130 corresponding to the primary graphic projection device 126, and a secondary graphics processing unit 132 corresponding to the secondary graphic projection device 128. The external scene camera 124 may be cameras that obtain periodic or sequential images representing a view of a surrounding environment outside the vehicle compartment 26. As described above, the monitoring system 72 includes one or more sensors for determining the location of a head of a passenger 14 within the vehicle compartment 26 as well as the orientation or gaze location of the passenger's eyes.

Figure 10A:
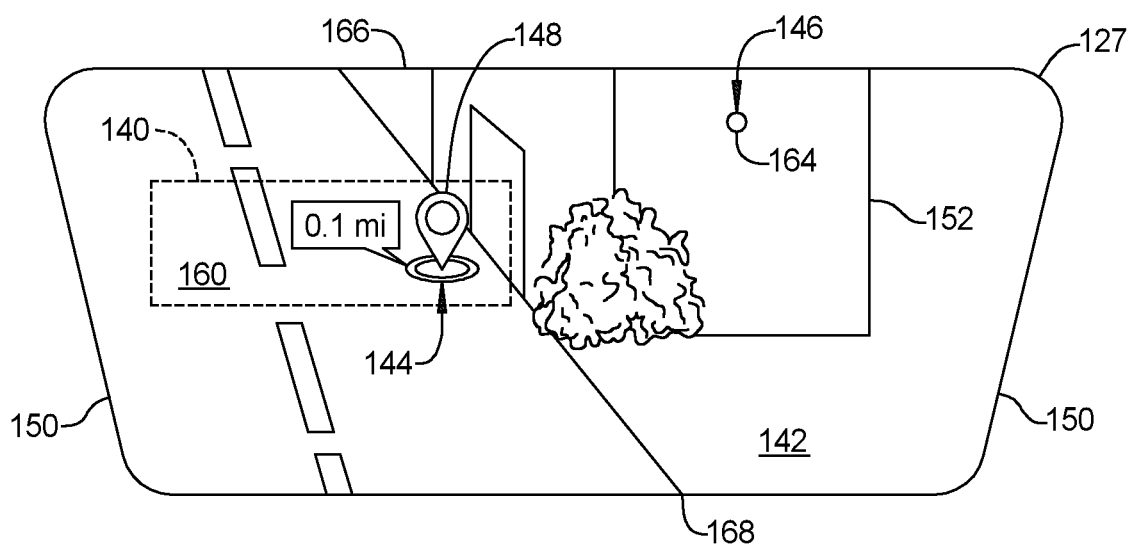
FIG. 10A is a schematic view of a window having an augmented reality display thereon having a single plane display.

When excitation light is absorbed by the light emitting particles 136, visible light is generated by the light emitting particles 136. In an embodiment, the light emitting particles 136 are red, green, and blue (RGB) phosphors for full color operation, however, it is to be appreciated that monochrome or a two-color phosphor may be used as well. Referring to FIG. 10A, the window 127 includes a primary area 140 and a secondary area 142, where the primary graphic projection device 126 generates a first set of images 144 upon the primary area 140 of the window 127 based on visible light, and the secondary graphic projection device 128 generates a second set of images 146 upon the secondary area 142 the window 127 based on an excitation light. Specifically, the light emitting particles 136 dispersed within the transparent substrate 138 emit visible light in response to absorbing the excitation light emitted by the secondary graphic projection device 128. The first set of images 144 displayed upon the primary area 140 of the window 127 cooperate with the second set of images 146 displayed upon the secondary area 142 of the window 127 to create an edge-to-edge augmented reality view of the environment outside the vehicle compartment 26.

The primary area 140 of the window 127 only includes a portion of the window 127 having a limited field-of-view, while the secondary area 142 of the window 127 includes a remaining portion of the window 127 that is not included as part of the primary area 140. Combining the primary area 140 with the secondary area 142 results in an augmented reality view of the environment outside the vehicle compartment 26 that spans from opposing side edges 150 of the window 127. The primary graphics processing unit 130 is in electronic communication with the primary graphic projection device 126, where the primary graphics processing unit 130 translates image-based instructions from the one or more controllers 129 into a graphical representation of the first set of images 144 generated by the primary graphic projection device 126. The first set of images 144 are augmented reality graphics 148 that are overlain and aligned with one or more objects of interest located in the environment outside the vehicle compartment 26 to provide a passenger with a virtual reality experience. In the example as shown in FIG. 10A, the augmented reality graphics 48 include a destination pin and text that reads "0.1 mi" that are overlain and aligned with an object of interest, which is a building 152. It is to be appreciated that the destination pin and text as shown in FIG. 10A is merely exemplary in nature and that other types of augmented reality graphics may be used as well. Some examples of augmented reality graphics 148 include, for example, circles or boxes that surround or highlight an object of interest, arrows, warning symbols, text, numbers, colors, lines, indicators, and logos.

Figure 10B:
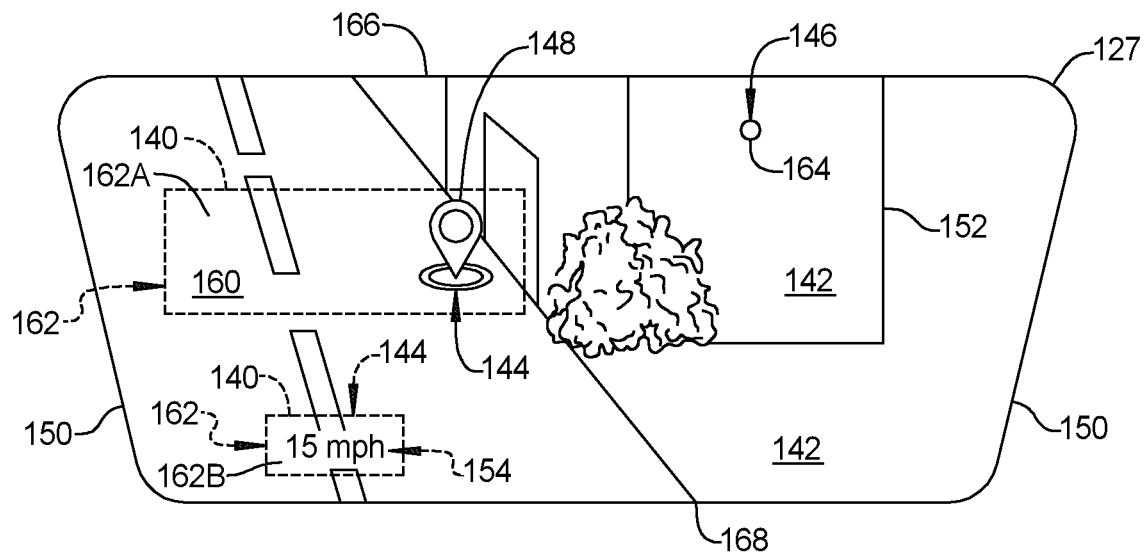
FIG. 10B is a schematic view of a window having an augmented reality display thereon having a dual plane display.

The primary graphic projection device 126 includes a visible light source configured to generate the first set of images 144 upon the window 127. The visible light source may be, for example, a laser or light emitting diodes (LEDs). In the embodiment as shown in FIG. 10A, the primary area 140 of the window 127 includes a single image plane 160, and the primary graphic projection device 126 is a single image plane augmented reality head-up display including a digital light projector (DLP) optical system In another exemplary embodiment, referring to FIG. 10B, the primary area 140 of the window 127 includes a dual image plane 162, and the primary graphic projection device 126 is a fixed dual image plane holographic augmented reality head-up display. In one embodiment, the dual image plane 162 may include a first, near-field image plane 162A and a second, far-field image plane 162B. In the present example, the first set of images 144 include both cluster content information 154 projected upon the near-field image plane 162A and the augmented reality graphics 148 projected upon the far-field image plane 162B. The cluster content information 154 informs the driver of the vehicle 14 of driving conditions such as, but not limited to, vehicle speed, speed limit, gear position, fuel level, current position, and navigational instructions. In the example as shown in FIG. 6B, the cluster content information 154 includes vehicle speed.

Referring again to FIG. 10A, the secondary graphics processing unit 132 is in electronic communication with the secondary graphic projection device 128, where the secondary graphics processing unit 132 translates image-based instructions from the controllers 129 into a graphical representation of the second set of images 146 generated by the secondary graphic projection device 128. The second set of images 146 include one or more primitive graphic objects 164. In the example as shown in FIG. 10A, the primitive graphic object 164 is a point position or pixel. Other examples of primitive graphic objects 164 include straight lines. As explained below, objects in the surrounding environment first appear in a periphery field of a driver, which is in the secondary area 142 of the window 127, as the primitive graphic object 164. An object of interest located in the secondary area 142 of the window 127 is first brought to the attention of the driver by highlighting the object with the secondary set of images 146 (i.e., the primitive graphic object 64). Once the object of interest travels from the secondary area 142 of the window 127 into the primary area 140 of the window 127, the object of interest is highlighted by the primary set of images 144 (i.e., the augmented reality graphic 148) instead.

The secondary graphic projection device 128 includes an excitation light source configured to generate the second set of images upon the window 127. Specifically, the light emitting particles 136 dispersed within the transparent substrate 138 on the window 127 emit visible light in response to absorbing the excitation light emitted by the secondary graphic projection device 128. In embodiments, the excitation light is either a violet light in the visible spectrum (ranging from about 380 to 450 nanometers) or ultraviolet light that induces fluorescence in the light emitting particles 136. It is to be appreciated that since the light emitting particles 136 are dispersed throughout the transparent substrate 138 on the window 127, there is no directionality in the fluorescence irradiated by the light emitting particles 136. Therefore, no matter where a passenger is located within the vehicle compartment 26, the fluorescence is always visible. In other words, no eye-box exists, and therefore the disclosed augmented reality display 125 may be used as a primary instrument. The excitation light source may be, for example, a laser or LEDs. In embodiments, the secondary graphic projection device 128 is a pico-projector having a relatively small package size and weight. A throw distance D is measured from the window 127 to a projection lens 158 of the secondary graphic projection device 128. The throw distance D is dimensioned so that the secondary area 142 of the window 127 spans from opposing side edges 150 of the window 127 and between a top edge 166 of the window 127 to a bottom edge 168 of the window 127.

Further details of the augmented reality display are included in U.S. patent application Ser. No. 17/749,464 to Seder et al., filed on May 20, 2022 and which is hereby incorporated by reference into the present application.

In an exemplary embodiment, the system 10 further includes an internal scene camera 170 mounted within the vehicle compartment 26 and in communication with the system controller 19. The internal scene camera 170 is oriented such that the internal scene camera 170 captures images of the augmented reality display 125.

Figure 11:
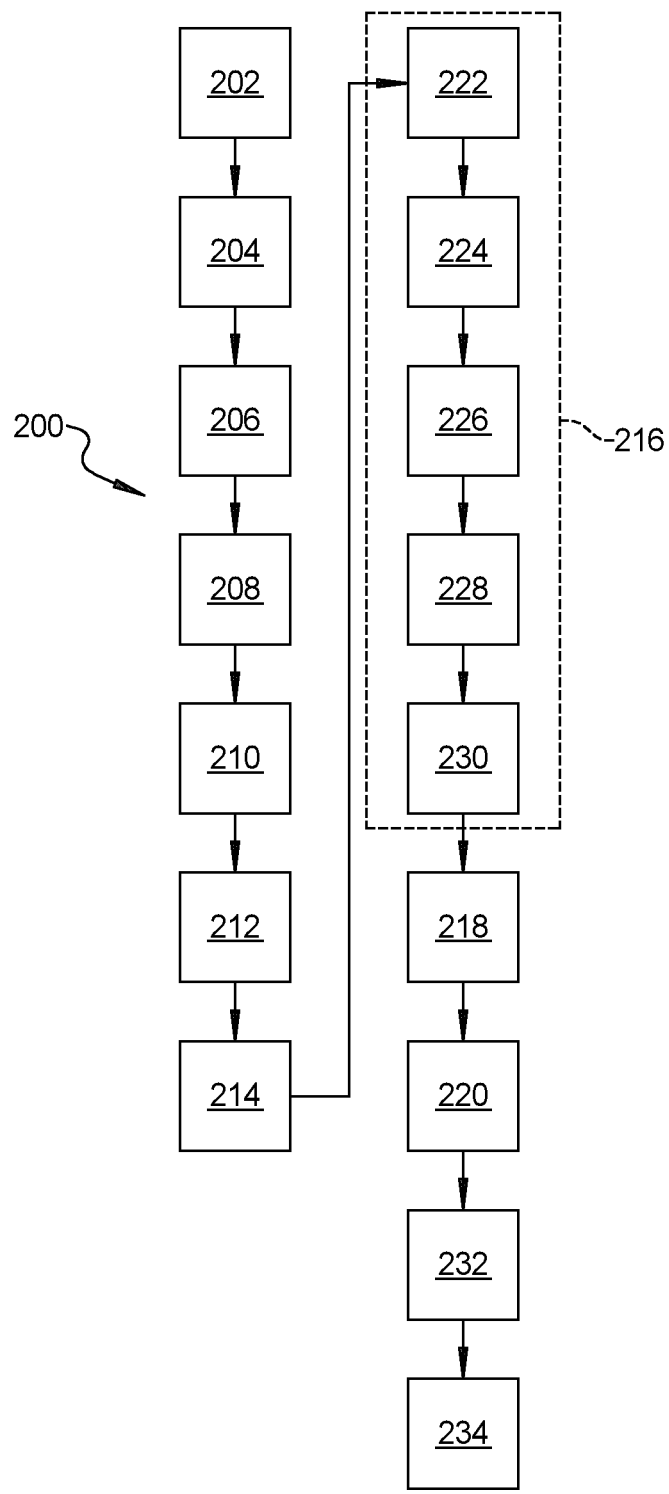
FIG. 11 is flow chart illustrating a method in accordance with the present disclosure.

Referring to FIG. 11, a method 200 of using a system 10 for generating a centrally located floating three-dimensional image display for a plurality of passengers 14 positioned within a vehicle compartment 26 includes, beginning at block 202, displaying, with a first display 18 of an image chamber 16 in communication with a system controller 19, a first image 12A, moving to block 204, receiving, with a first reflector 20 individually associated with a first passenger 14A, the first image 12A from the first display 18, and, moving to block 206, reflecting, with the first reflector 20, the first image 12A to the first passenger 14A, wherein the first passenger 14A perceives the first image 12A floating at a central location within the image chamber 16.

Moving to block 208, the method 200 further includes displaying, with a second display 22 of the image chamber 16 in communication with the system controller 19, a second image 12B, moving to block 210, receiving, with a second reflector 24 individually associated with a second passenger 14B, the second image 12B from the second display 22, and, moving to block 212, reflecting, with the second reflector 24, the second image 12B to the second passenger 14B, wherein the second passenger 14B perceives the second image 12B floating at the central location within the image chamber 16.

Moving to block 214, the method 200 includes displaying, with a transparent display 46 in communication with the system controller 19 and positioned between eyes of the first passenger 14A and the first reflector 20 and between the eyes of the second passenger 14B and the second reflector 24, first private information to the first passenger 14A within an image plane 48 positioned in front of the first image 12A floating at the central location within the image chamber 16 and second private information to the second passenger 14B within an image plane 50 positioned in front of the second image 12B floating at the central location within the image chamber 16.

Moving to block 216, the method 200 includes receiving, with the system controller 19, input from the first passenger 14A and the second passenger 14B. Moving to block 218, the method 200 includes collecting, with an external scene camera 124, images of an external environment outside the vehicle compartment 26, and, moving to block 220, displaying, with an augmented reality display 125 in communication with the system controller 19 and positioned within the vehicle compartment 26 remotely from the image chamber 16, general information related to at least one of the first image 12A, the second image 12B, the first and second private information displayed on the transparent display 46 and the input received from the first passenger 14A and the second passenger 14B.

In an exemplary embodiment, the receiving, with the system controller 19, input from the first passenger 14A and the second passenger 14B, at block 216, further includes, moving to block 222, receiving, with the system controller 19, via the transparent display 46, input from the first passenger 14A and the second passenger 14B, moving to block 224, receiving, with the system controller 19, via at least one first sensor 74, input comprising a position of a head and eyes of the first passenger 14A, moving to block 226, receiving, with the system controller 19, via at least one first gesture sensor 110, information related to gestures made by the first passenger 14A, moving to block 228, collecting, with the system controller 19, via a first microphone 116, audio input from the first passenger 14A, and, moving to block 230, collecting, with the system controller 19, via a second microphone 118, audio input from the second passenger 14B.

Moving to block 232, the method 200 further includes broadcasting, with the system controller 19, via a first zonal speaker 120, audio output for the first passenger 14A, and, moving to block 234, broadcasting, with the system controller 19, via a second zonal speaker 122, audio output for the second passenger 14B.

Figure 12:
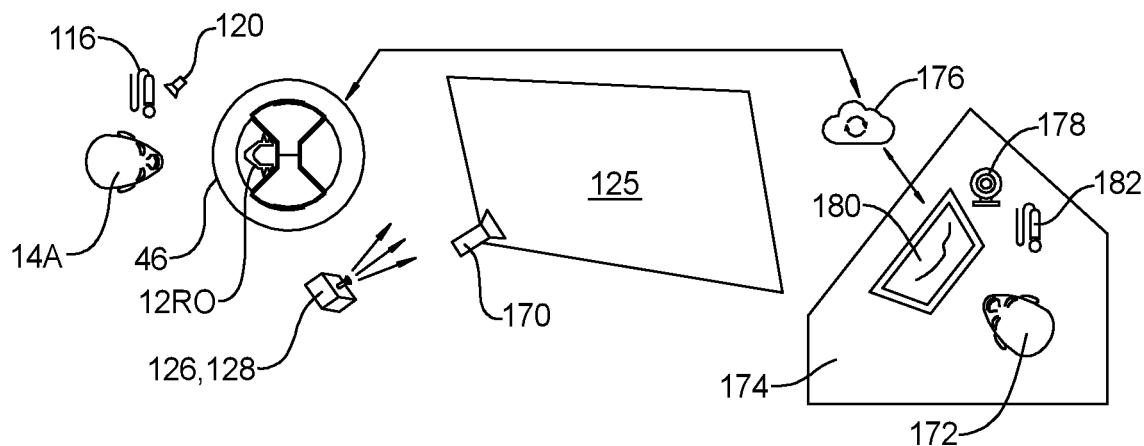
FIG. 12 is schematic view of the system of the present disclosure being utilized with a gaming system.

Referring to FIG. 12, in an exemplary embodiment, the system is adapted to support interactive gaming between the first passenger 14A and a remote opponent 172. The first passenger 14A is located within the vehicle compartment 26, and the remote opponent 172 is located at a remote location 174. A gaming system can be included within the system controller 19, a game console connected to the system controller, or within a game console at the remote location 174. The system controller communicates with the remote opponent via the cloud 176 to allow the first passenger and the remote opponent 172 to join a shared gaming environment.

Wherein, the displaying the first image 12A at block 202, further includes, including within the first image 12A, an image 12RO of the remote opponent 172. The image 12RO of the remote opponent 172 is captured by a remote camera 176 at the remote location. Further wherein, the displaying, with the transparent display 46, first private information at block 214 includes, including, within the first private information displayed to the first passenger 14A on the transparent display 46, game information. Game information displayed on the transparent display 46 may be any textual or graphic information meant only for the first passenger 14A to see, such as personal stats, available in-game tools/weapons, etc.

The displaying, with the augmented reality display 125, general information at block 220 further includes, including, within the general information displayed on the augmented reality display 125, gameplay action. Thus, the first passenger 14A sees the image 12RO of the remote opponent 172 floating in front of the first passenger within the image chamber 16, and receives game information relevant to the first passenger 14A on the transparent display 46, which may also be utilized by the first passenger 14A to provide input to the game, such as selection of in-game options.

Figure 13:
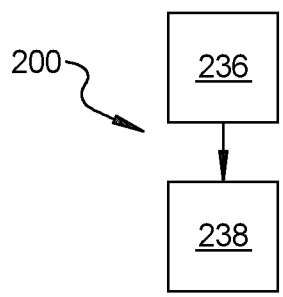
FIG. 13 is a flow chart illustrating additional steps to the method illustrated in FIG. 11 related to capturing images with an internal scene camera.

Referring to FIG. 13, in an exemplary embodiment, the method 200 further includes, moving to block 236, capturing, with the internal scene camera 170 mounted within the vehicle compartment 26 and in communication with the system controller 19, images of the augmented reality display 125, and, moving to block 238, sending, with the system controller 19, images of the augmented reality display 125 to the remote opponent 172. Thus, the first passenger 14A, and any other passengers 14 within the vehicle compartment can watch the gameplay action on the augmented reality display 125 within the vehicle compartment 26, and the remote opponent 172 can watch the gameplay action on a remote display 180 at the remote location 174.

In an exemplary embodiment, the receiving, with the system controller 19, via the at least one first sensor 74, input comprising a position of a head and eyes of the first passenger 14A at block 224, and, the receiving, with the system controller 19, via the at least one first gesture sensor 110, information related to gestures made by the first passenger 14A, at block 226, further includes sending, with the system controller 19, input from the first passenger 14A collected by the transparent display 46, the at least one first sensor 74 and the at least one gesture sensor 110 to the game system for incorporation into gameplay action. Thus, the game system can detect when the first passenger 14A points to objects that appear within the augmented reality display, or when the first passenger 14A looks at a specific object within the gameplay action and incorporate such actions by the first passenger 14A into the gameplay action. For example, when the first passenger 14A controls a player-character within the gameplay, the actions of the player character may be controlled and triggered by actual gestures made by the first passenger 14A.

In an exemplary embodiment, the collecting, with the system controller 19, via a first microphone 116, audio input from the first passenger 14A, at block 228 further includes collecting audio input from the first passenger 14A related to gameplay, and communications from the first passenger 14A to the remote opponent 172. The broadcasting, with the system controller 19, via a first zonal speaker 120, audio output for the first passenger 14A, at block 232 further includes broadcasting, with the system controller 19, via the first zonal speaker 120, audio output for the first passenger 14A, including audible communications from the remote opponent 172 captured by a remote microphone 182 at the remote location 174. Thus, the system supports communication between the first passenger 14A and the remote opponent 172 with the first microphone 116, the first zonal speaker 120, and the remote microphone 182.

Figure 14:
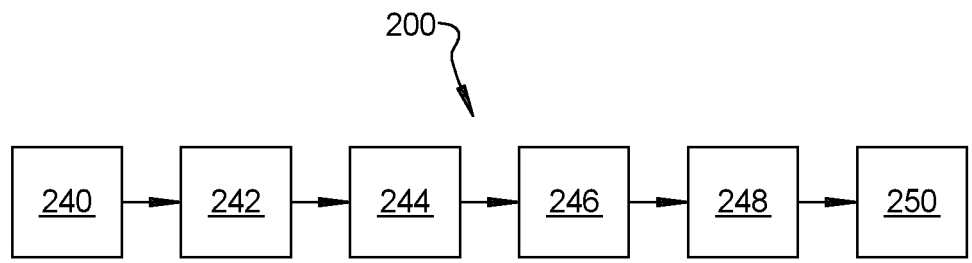
FIG. 14 is a flow chart illustrating additional steps to the method illustrated in FIG. 11 wherein the system is adapted to support a personalized driving tour for the plurality of passengers positioned within the vehicle compartment.
Figure 15:
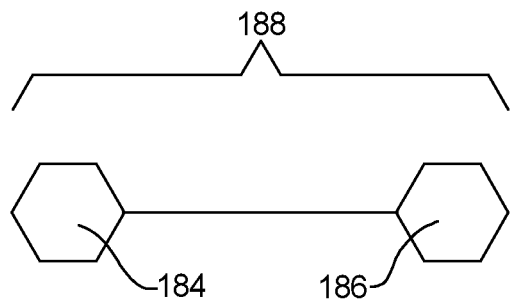
FIG. 15 is a schematic diagram of a first pre-determined stop, a second pre-determined stop and a pre-determine path for a driving tour.

In another exemplary embodiment, the system 10 is adapted to support a personalized driving tour for the plurality of passengers 14 positioned within the vehicle compartment 26. Referring to FIG. 14 and FIG. 15, the method 200, further includes, moving to block 240, collecting, with the system controller, information related to a first pre-determined site 184 and a second pre-determined site 186 located along a pre-determined path 188 of a driving tour. The first and second pre-determined sites may be downloaded by the system controller 19 from the internet, or may be manually input by a passenger 14, via the transparent display 46. Once the first and second pre-determined stops 184, 186 along the path 188 of the driving tour have been established, the method 200 includes, moving to block 242, collecting, with the system controller 19, information related to the first passenger 14A and the second passenger 14B.

Information related to the first and second passengers 14A, 14B can be collected based on direct input by the first and second passengers 14A, 14B, or, such information may be pulled from a database within the system controller 19 where information related to the first and second passengers 14A, 14B is stored based on past behavior. Further, the system may be adapted to prompt a passenger for personal interests, wherein, when the system 10 identifies multiple potential points of interest, the passenger 14 is allowed to select a point of interest that they are interested in. Moving to block 244, the method 200 includes identifying, with the system controller 19, at least one first point of interest located between the first pre-determined site 184 and the second pre-determined site 186 and relevant to the first passenger 14A and collecting information related to the at least one first point of interest. The system controller 19, by accessing the internet and mapping services, will look for points of interest along the pre-determined path 188 and match information related to the first passenger 14A to points of interest to identify at least one first point of interest related to the first passenger 14A along the path 188, between the first and second pre-determined sites 184, 186.

Moving to block 246, the method 200 includes identifying, with the system controller 19, at least one second point of interest located between the first pre-determined site 184 and the second pre-determined site 186 and relevant to the second passenger 14B and collecting information related to the at least one second point of interest. The system controller 19, by accessing the internet and mapping services, will look for points of interest along the pre-determined path 188 and match information related to the second passenger 14B to points of interest to identify at least one second point of interest along the path 188, between the first and second pre-determined sites 184, 186.

Moving to block 248, when the vehicle is stopped at the first pre-determined site 184, and, when the vehicle is traveling between the first pre-determined site 184 and the second pre-determined site 186, and when the vehicle is stopped at the second pre-determined site 186, the method 200 further includes, including, with the system controller 19, the information related to the at least one first point of interest within the first image 12A and including, with the system controller 19, the information related to the at least one second point of interest within the second image 12B.

Thus, at all times, the system controller is looking for a point of interest relevant to the passenger, and when stopped at or passing by such point of interest, displays information about that point of interest within the first and second images floating within the image chamber, and displays information about the points of interest on the transparent display 46.

Moving to block 250, the method 200 further includes, when stopped at the first pre-determined site 184, including, with the system controller 19, information related to the first pre-determined site within the general information displayed by the augmented reality display 125, and, when stopped at the second pre-determined site 186, including, with the system controller 19, information related to the second pre-determined site within the general information displayed by the augmented reality display 125.

Thus, when stopped at one of the pre-determined sites 184, 186 along a pre-determined path 188, the system 10 will display information related to the pre-determined sites 184, 186 on the augmented reality display 125, such that the information related to the pre-determined sites 184, 186 is visible by all passengers 14 within the vehicle compartment 26.

For example, a pre-determined route 188 is a driving tour of a famous battlefield and the surrounding area. The first pre-determined site 184 is a wheatfield and the second pre-determined site is a battlefield, such as "Little Roundtop". When the driving tour stops at the wheatfield (first pre-determined site 184), the system displays information about the wheatfield on the augmented reality display for all passengers 14 within the vehicle compartment 26 to see. Simultaneously, while stopped at the wheatfield, the system 10 identifies a point of interest, such as a battlefield map, that is of interest to the first passenger 14A, and includes the battlefield map within the first image and displays textual information about the battlefield map within the transparent display 46 for the first passenger 14. Further, while stopped at the wheatfield, the system 10 identifies a point of interest, such as a battlefield re-enactment, that periodically takes place at the wheatfield, and is of interest to the second passenger 14B. The system includes information about the re-enactment such as maps, pictures, etc. within the second image and displays textual information about the re-enactment and prompts the second passenger 14B for selections for additional information within the transparent display 46 for the second passenger 14B.

When traveling between the wheatfield (first pre-determined site 184 and the battlefield (second pre-determined site 186), the augmented reality display is blank, but the system continues to display information for each of the passengers within the first and second images and on the transparent display. For example, while traveling between the wheatfield and the battlefield, the system 10 identifies a point of interest, such as information related to weapons and ammunition used at the time of the battle, that is of interest to the first passenger 14A, and includes such information within the first image and displays textual information about the weapons and ammunition within the transparent display 46 for the first passenger 14, as well as allowing the first passenger to make a selection to request additional information about a specific weapon or type of ammunition, via the touch screen feature of the transparent display 46. Further, the system 10 identifies a point of interest, such as a site where two famous commanders argued, that is of interest to the second passenger 14B. The system 10 includes information about the argument, such as a picture of the two commanders arguing, within the second image and displays textual information about the argument, such as why the commanders argued and who may have won the argument, within the transparent display 46 for the second passenger 14B.

Finally, when the driving tour stops at the battlefield (second pre-determined site 186), the system displays information about the battlefield on the augmented reality display 125 for all passengers 14 within the vehicle compartment 26 to see. Simultaneously, while stopped at the battlefield 186, the system 10 identifies a point of interest, such as conditions that soldiers were forced to endure during the battle, that is of interest to the first passenger 14A, and includes pictures and information within the first image and displays textual information within the transparent display 46 for the first passenger 14. Further, the system 10 identifies a point of interest, such as details of hand to hand fighting techniques used by the soldiers during the battle, that is of interest to the second passenger 14B. The system 10 includes information about hand to hand fighting techniques within the second image and displays textual information about hand to hand fighting techniques and prompts the second passenger 14B for selections for additional information within the transparent display 46 for the second passenger 14B.

In an exemplary embodiment, the broadcasting, with the system controller 19, via a first zonal speaker 120, audio output for the first passenger 14A, at block 232 and the broadcasting, with the system controller 19, via a second zonal speaker 122, audio output for the second passenger 14B, at block 234, includes broadcasting audible information to the first passenger 14A and the second passenger 14B related to the pre-determined sites 184, 186 along the path 188, when stopped at one of the pre-determined sites 184, 186, and, broadcasting audible information to the first passenger 14A related to the at least one identified first point of interest, and audible information to the second passenger 14B related to the at least one identified second point of interest, when traveling between the pre-determined sites 184, 186 along the path 188.

In an exemplary embodiment, the collecting, with the system controller 19, via the first microphone 116, audio input from the first passenger 14A, at block 228, includes receiving, via the first microphone 116, a command from the first passenger that triggers the system 10 to "look" for an object which is being observed by the first passenger 14. For example, the first passenger may say a pre-determined phrase, such as "Hey General", which triggers the system 10. Upon triggering of the system 10, the receiving, with the system controller 19, via at least one first sensor 74, input comprising a position of a head and eyes of the first passenger 14A at block 224 and the receiving, with the system controller 19, via at least one first gesture sensor 110, information related to gestures made by the first passenger 14A at block 226, further includes identifying, based on the data related to gestures made by the first passenger 14A, the direction of the gaze of the first passenger 14A and images of the external environment outside the vehicle compartment 26, collected at block 218, an object outside of the vehicle compartment 26 that the first passenger 14A is looking at through the window 127 with the augmented reality display 125.

Gaze and gesture tracking allow the system 10 to generate a vector which defines an array of GPS coordinates. The point where this vector intersects the image from the external scene camera 124 identifies the observed object and allows calculation of a distance to the observed object. Merging the captured image of the external environment with the GPS coordinate vector allows the system to pinpoint a GPS location of the observed object.

Further, the displaying, with an augmented reality display 125 in communication with the system controller 19 and positioned within the vehicle compartment 26 remotely from the image chamber 16, general information at block 220, includes highlighting the object that is being observed by the first passenger 14A within the augmented reality display 125.

Further, the receiving, with the system controller 19, via the transparent display 46, input from the first passenger 14A at block 222 includes supporting, with the system controller 19, via the transparent display 46, interaction, by the first passenger 14A, with the first image 12A, which includes an image of the observed object, and allows the first passenger 14A to rotate the image, or enlarge or reduce the image. Further the first passenger 14A may via the touch screen features of the transparent display 46, annotate the displayed object, such annotations appearing in the augmented reality display 125 for viewing by all the passengers 14 within the vehicle compartment 26. Thus, the first passenger 14A can see an object outside the vehicle compartment 26, initialize the system by saying "Hey General", wherein, the system will identify the object being observed by the first passenger 14A, and highlight the object within the augmented reality display 125. The system will also include the observed object within the first image 12A, wherein the first passenger 14A can annotate the observed object, and such annotations will appear in the augmented reality display 125 for viewing by all passengers 14 within the vehicle compartment 26.

The system controller 19 is adapted to determine if an observed object is a permanent object, such as a building or mountain, or if an observed object is a non-permanent object, such as a vehicle or a person. In an exemplary embodiment, the identifying an observed object based on the data related to gestures made by the first passenger 14A, the direction of the gaze of the first passenger 14A and images of the external environment outside the vehicle compartment 26, further includes, when the system controller 19, determines that the observed object is a permanent object, collecting information, with the system controller 19, from remote data sources, related to the object, and including, within the first private information displayed on the transparent display 46, textual information related to the observed object. When the system controller 19 determines that the object is a permanent object, the system controller 19 accesses the internet for information about the identified permanent object. For example, the observed permanent object may be a building, wherein the system controller 19 can access the internet and remote data bases, such as yellow pages, to obtain an address for the building, which the system controller 19 then displays on the transparent display 46.

Further, the identifying an observed object based on the data related to gestures made by the first passenger 14A, the direction of the gaze of the first passenger 14A and images of the external environment outside the vehicle compartment 26, further includes, when the system controller 19, determines that the observed object is a non-permanent object, identifying the observed object with object identification algorithms within the system controller, and including, within the first private information displayed on the transparent display 46, textual information related to the observed object. For example, if the system controller determines that the observed object is a person, the system controller 19 displays this identification on the transparent display 46.

Figure 16:
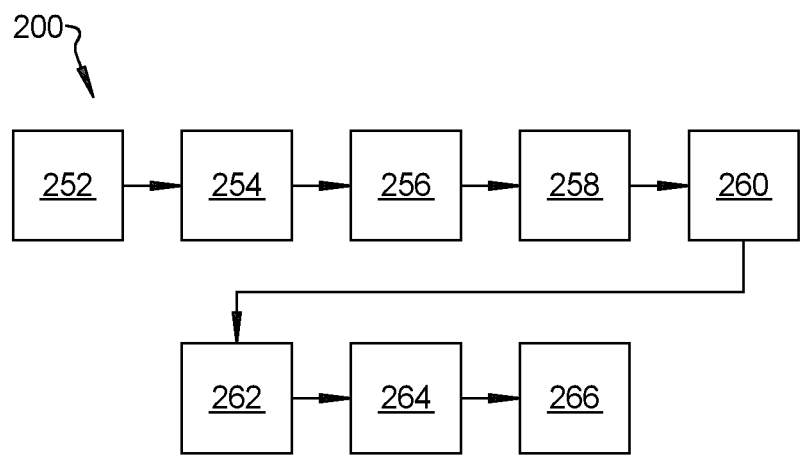
FIG. 16 is a flow chart illustrating additional steps to the method illustrated in FIG. 11 related to displaying information related to shopping interests of a passenger.
Figure 17:
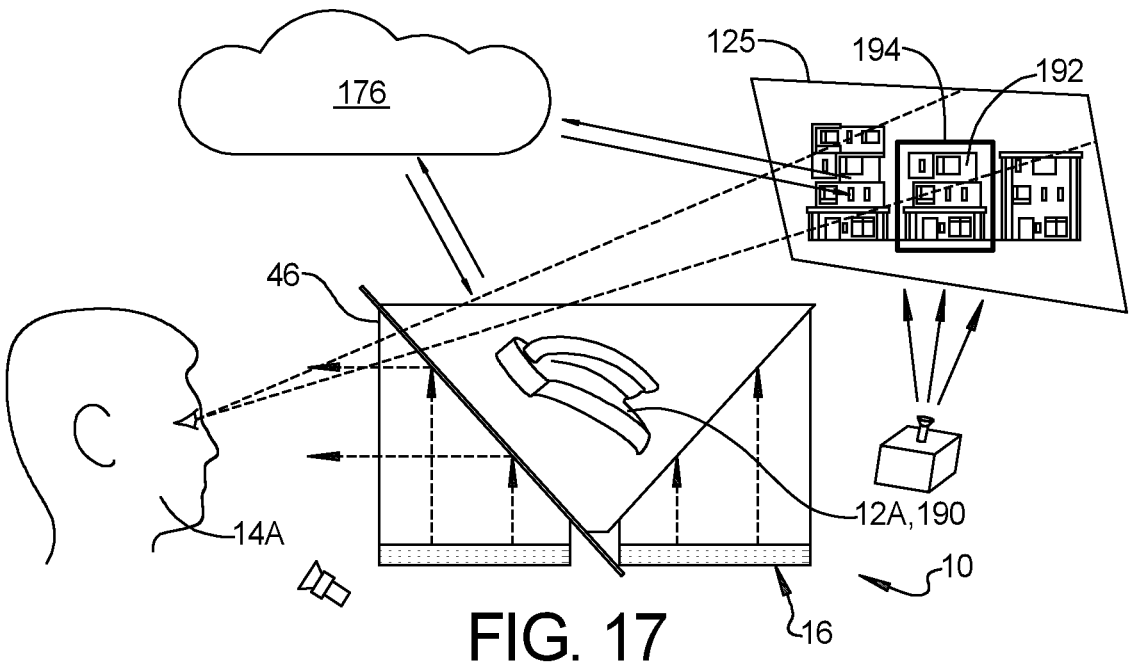
FIG. 17 is schematic diagram of the system wherein images related to shopping interest of a passenger are displayed.

Referring to FIG. 16, the method 200 further includes, moving to block 252, collecting, with the system controller 19, from remote data sources, information related to shopping interests of the first passenger 14A. Referring to FIG. 17, for example, the system controller 19 receives information collected by remote data collection databases, such as google, information about the first passenger's 14A shopping habits via the cloud 176. Moving to block 254, the method 200 includes identifying an item 190 that the first passenger 14A may be interested in purchasing based on the information related to shopping interest of the first passenger 14A, moving to block 256, identifying, with the system controller 19, retailers 192 that sell the item 190 and are located one of, within a pre-determined distance, and located on a pre-determined route, moving to block 258, collecting, with the system controller 19, from identified retailers 192, quantity and pricing information about the item 190, and, moving to block 260, including, within the first private information displayed to the first passenger 14A on the transparent display 46, the information related to retailers 192 that sell the item 190, quantity and pricing of the item 190. As shown in the example in FIG. 17, the first image 12A, includes an image of an item 190, as shown a garlic press, that may be of interest to the first passenger 14A. The system controller 19 may display only one item, or may display multiple items to the first passenger 14A.

Moving to block 262, the method 200 further includes receiving, with the system controller 19, via the transparent display 46, input from the first passenger 14A expressing interest in the item 190. Moving to block 264, the method includes, including, within the first image 12A, an image of the item 190. The system controller 19 will display, on the transparent display 46, information listing items that may be of interest to the first passenger 14A, and information about such items and where they are available. When the first passenger 14A selects, via the touch screen features of the transparent display 46, an item 190, here a garlic press, the system controller 19 displays an image of the garlic press within the first image 12A. Further, moving to block 266, the method 200 includes highlighting, within the augmented reality display 125, an identified retailer 192, when an identified retailer 192 is visible through the window 127 and the augmented reality display 125. When the vehicle passes a retailer that has been identified by the system controller 19 as a retailer that sells the item 190 (garlic press), then the system controller 19 displays a highlight 194 around the retailer 192 within the augmented reality display 125, drawing the first passenger's 14A attention to the retailer 192.

In another exemplary embodiment, the receiving, with the system controller 19, via the transparent display 46, input from the first passenger 14A at block 222, further includes, receiving, via the transparent display 46, input from the first passenger 14A including augmentations to the displayed first image. For example, the first passenger 14A may want to provide a highlight to an object within the first image, or add drawn in annotations using the touch screen features of the transparent display 46. The system 10 may provide a series of pasteable forms that the first user 14A can drag onto the first image 12A.

When the first passenger 14A is finished annotating the first image 12A, the receiving, with the system controller 19, via the transparent display 46, input from the first passenger 14A at block 222, further includes receiving, with the system controller 19, from the first passenger 14A, input indicating that the first passenger 14A is finished and wants to display the first image 12A and the annotations to the first image 12A within the augmented reality display. Alternatively, when the first passenger 14A is finished annotating the first image 12A, the receiving, with the system controller 19, via at least one first gesture sensor 110, information related to gestures made by the first passenger 14A at block 226, further includes receiving, with the system controller 19, from the first passenger 14A, input comprising a hand gesture indicating that the first passenger 14A is finished and wants to display the first image 12A and the annotations to the first image 12A within the augmented reality display 125. The hand gesture may be a swiping motion wherein the first passenger 14A simulates dragging and "throwing" the first image 12A and the annotations toward the augmented reality display 125.

Finally, the displaying, with an augmented reality display 125 in communication with the system controller 19 and positioned within the vehicle compartment 26 remotely from the image chamber 16, general information at block 220, further includes, including, within the general information displayed on the augmented reality display 125, the first image 12A as augmented by the first passenger 14A and including the annotations made to the first image 12A by the first passenger 14A.

In another exemplary embodiment, the receiving, with the system controller 19, via the transparent display 46, input from the first passenger 14A at block 222, further includes receiving, from the first passenger 14A, input on a destination. For example, the destination may be the location of a friend that needs to be picked up. Further, the displaying, with the transparent display 46 in communication with the system controller 19 and positioned between eyes of the first passenger 14A and the first reflector 20 and between the eyes of the second passenger 14B and the second reflector 24, second private information to the second passenger 14B at block 214, further includes, including, in the second private information displayed on the transparent display 46 for the second passenger 14B, information about the destination, and the displaying, with an augmented reality display 125 in communication with the system controller 19 and positioned within the vehicle compartment 26 remotely from the image chamber 16, general information at block 220, further includes highlighting, within the augmented reality display 125, the destination when the destination is visible within through the window 127 and the augmented reality display 125. For example, when the vehicle approaches the destination where a friend is to be picked up, the system 10 may display a marker at the destination as the vehicle approaches.

In another exemplary embodiment, the broadcasting, with the system controller 19, via a first zonal speaker 120, audio output for the first passenger 14A at block 232, and the broadcasting, with the system controller 19, via a second zonal speaker 122, audio output for the second passenger 14B at block 234, further includes broadcasting an audible alert that the vehicle is nearing the destination as the vehicle approaches the destination. For example, the system controller 19 may provide an audible alert, such as "Your friend is on your left in 200 yards".

A system of the present disclosure offers several advantages. These include providing a floating image that is perceived by the passengers at a centrally location position within the vehicle compartment. This provides a camp-fire like viewing atmosphere where the passengers can all view a common floating image, or each passenger can view a unique floating image. Further, a system in accordance with the present disclosure provides the ability to display annotations and information not embedded within the virtual image and to ensure such annotations and information are perceived by a passenger at a proper location relative to the virtual image and in a plane between the passenger and the floating image. The system also allows a passenger to interact with the virtual image via the touch screen passenger interface and uses parallax compensation to ensure the system correctly correlates passenger input via the passenger interface to annotations and information displayed along with the virtual image.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of using a system for generating a centrally located floating three-dimensional image display for a plurality of passengers positioned within a vehicle compartment, wherein the system is adapted to support interactive gaming between the first passenger and a remote opponent, comprising:
    displaying, with a first display of an image chamber in communication with a system controller, a first image;
    including, within the first image, an image of the remote opponent;
    receiving, with a first reflector individually associated with a first passenger, the first image from the first display;
    reflecting, with the first reflector, the first image to the first passenger, wherein the first passenger perceives the first image floating at a central location within the image chamber;
    displaying, with a second display of the image chamber in communication with a system controller, a second image;
    receiving, with a second reflector individually associated with a second passenger, the second image from the second display;
    reflecting, with the second reflector, the second image to the second passenger, wherein the second passenger perceives the second image floating at the central location within the image chamber;
    displaying, with a transparent display in communication with the system controller and positioned between eyes of the first passenger and the first reflector and between the eyes of the second passenger and the second reflector, first private information to the first passenger within an image plane positioned in front of the first image floating at the central location within the image chamber and second private information to the second passenger within an image plane positioned in front of the second image floating at the central location within the image chamber;
    including, within the first private information displayed to the first passenger on the transparent display, game information;
    receiving, with the system controller, input from the first passenger and the second passenger;
    collecting, with an external scene camera, images of an external environment outside the vehicle compartment;
    displaying, with an augmented reality display in communication with the system controller and positioned within the vehicle compartment remotely from the image chamber, general information related to at least one of the first image, the second image, the first and second private information displayed on the transparent display and the input received from the first passenger and the second passenger;
    including, within the general information displayed on the augmented reality display, gameplay action.

2. The method of claim 1, wherein the augmented reality display includes a transparent substrate, having light emitting particles dispersed therein, positioned on a window within the vehicle compartment, the displaying, with the augmented reality display positioned within the vehicle compartment remotely from the image chamber, general information related to the first image, the private information displayed on the transparent display and the input received from the first passenger including:
- generating, with a primary graphic projection device in communication with the system controller, a first set of images upon the window within the vehicle compartment based on visible light, wherein the first set of images are displayed upon a primary area of the window; and
- generating, with a secondary graphic projection device in communication with the system controller, a second set of images upon a secondary area of the window based on an excitation light, wherein the light emitting particles in the windscreen emit visible light in response to absorbing the excitation light, and wherein the first set of images displayed upon the primary area of the windscreen cooperate with the second set of images displayed upon the secondary area of the windscreen to create an edge-to-edge augmented reality image.

3. The method of claim 2, wherein, the receiving, with the system controller, input from the first passenger and the second passenger, further includes:
- receiving, with the system controller, via the transparent display, input from the first passenger and the second passenger;
- receiving, with the system controller, via at least one first sensor, input comprising a position of a head and eyes of the first passenger;
- receiving, with the system controller, via at least one first gesture sensor, information related to gestures made by the first passenger;
- collecting, with the system controller, via a first microphone, audio input from the first passenger; and
- collecting, with the system controller, via a second microphone, audio input from the second passenger; and
the method further including:
- broadcasting, with the system controller, via a first zonal speaker, audio output for the first passenger; and
- broadcasting, with the system controller, via a second zonal speaker, audio output for the second passenger.

4. The method of claim 1, further including:
- capturing, with an internal scene camera mounted within the vehicle compartment and in communication with the system controller, images of the augmented reality display; and
- sending, with the system controller, images of the augmented reality display to the remote opponent.

5. The method of claim 4, further including:
- receiving, with the system controller, via the at least one first sensor, input comprising a position of a head and eyes of the first passenger;
- receiving, with the system controller, via the at least one first gesture sensor, information related to gestures made by the first passenger; and
- sending, with the system controller, input from the first passenger collected by the transparent display, the at least one first sensor and the at least one gesture sensor to a game system for incorporation into gameplay action.

6. The method of claim 5, further including supporting communication between the first passenger and the remote opponent with the first microphone and the first zonal speaker.

7. The method of claim 3, wherein the system is adapted to support a personalized driving tour for the plurality of passengers positioned within the vehicle compartment, the method including:
- collecting, with the system controller, information related to a first pre-determined site and a second pre-determined site located along a pre-determined path of a driving tour;
- collecting, with the system controller, information related to the first passenger and the second passenger;
- identifying, with the system controller, at least one first point of interest located between the first pre-determined site and the second pre-determined site and relevant to the first passenger and collecting information related to the at least one first point of interest;
- identifying, with the system controller, at least one second point of interest located between the first pre-determined site and the second pre-determined site and relevant to the second passenger and collecting information related to the at least one second point of interest; and
- when stopped at the first pre-determined site and when traveling between the first pre-determined site and the second pre-determined site, and when stopped at the second pre-determined site, including, with the system controller, the information related to the at least one first point of interest within the first image and including, with the system controller, the information related to the at least one second point of interest within the second image.

8. The method of claim 7, further including, when stopped at the first pre-determined site, including, with the system controller, information related to the first pre-determined site within the general information displayed by the augmented reality display.

9. The method of claim 3, further including, with the system controller:
- receiving, via the first microphone, a command from the first passenger;
- receiving, via the at least one first sensor and the at least one first gesture sensor data related to gestures made by the first passenger and the direction of a gaze of the first passenger;
- identifying, based on the data related to gestures made by the first passenger, the direction of the gaze of the first passenger and images of the external environment outside the vehicle compartment, an object outside of the vehicle compartment that the first passenger is looking at through the window with the augmented reality display;
- highlighting the object within the augmented reality display; and
- supporting, with the system controller, via the transparent display, interaction, by the first passenger, with the first image.

10. The method of claim 9, wherein, when the system controller determines that the object is a permanent object, the method includes:
- collecting information, with the system controller, from remote data sources, related to the object; and
- including, within the first private information, textual information related to the object.

11. The method of claim 9, wherein, when the system controller determines that the object is a non-permanent object, the method includes:
- identifying the object with object identification algorithms within the system controller;
- including, within the first private information, textual information related to the object.

12. The method of claim 3, further including:
collecting, with the system controller, from remote data sources, information related to shopping interests of the first passenger;
identifying an item that the first passenger may be interested in purchasing based on the information related to shopping interest of the first passenger;
identifying, with the system controller, retailers that sell the item and are located one of, within a pre-determined distance, and located on a pre-determined route;
collecting, with the system controller, from identified retailers, quantity and pricing information about the item; and
including, within the first private information, the information related to retailers that sell the item, quantity and pricing if the item.

13. The method of claim 12, further including:
receiving, with the system controller, via the transparent display, input from the first passenger expressing interest in the item;
including, within the first image, an image of the item; and
highlighting, within the augmented reality display, an identified retailer, when an identified retailer is visible through the window and the augmented reality display.

14. The method of claim 3, further including:
receiving, via the transparent display, input from the first passenger including augmentations to the first image;
receiving, with the system controller, from the first passenger, input indicating that the first passenger is finished and wants to display the first image and the augmentations within the augmented reality display; and
including, within the general information displayed on the augmented reality display, the first image and augmentations by the first passenger.

15. The method of claim 3, further including:
receiving, from the first passenger, input on a destination;
including, in the second private information displayed on the transparent display for the second passenger, information about the destination; and
highlighting, within the augmented reality display, the destination when the destination is visible through the window and the augmented reality display.

16. The method of claim 1, further including:
receiving, from the first passenger, input on a destination;
including, in the second private information displayed on the transparent display for the second passenger, information about the destination; and
highlighting, within the augmented reality display, the destination when the destination is visible through the window and the augmented reality display.

17. A system for generating a centrally located floating three-dimensional image display for a plurality of passengers positioned within a vehicle compartment within a vehicle, comprising:
a system controller;
an image chamber including:
a first display adapted to project a first image;
a first reflector individually associated with the first display and a first one of the plurality of passengers, the first reflector adapted to receive the first image from the first display and to reflect the first image to the first passenger, wherein the first passenger perceives the first image floating at a central location within the image chamber;
a second display adapted to project a second image; and
a second reflector individually associated with the second display and a second one of the plurality of passengers, the second reflector adapted to receive the second image from the second display and to reflect the second image to the second passenger, wherein, the second passenger perceives the second image floating at the central location within the image chamber; and
a transparent touch screen display positioned between the first reflector and the first passenger and between the second reflector and the second passenger and adapted to display first private information to the first passenger within an image plane positioned in front of the first image floating at the central location within the image chamber and to receive input from the first passenger, and adapted to display second private information to the second passenger within an image plane positioned in front of the second image floating at the central location within the image chamber and to receive input from the second passenger;
an external scene camera adapted to collect images of an external environment outside the vehicle compartment;
an augmented reality display positioned within the vehicle compartment remotely from the image chamber and adapted to display general information related to at least one of the first image, first and second private information displayed on the transparent display and input received from the first and second passengers; and
an internal scene camera mounted within the vehicle compartment and in communication with the system controller and adapted to capture images of the augmented reality display.

18. The system of claim 17, wherein the augmented reality display includes:
a transparent substrate, having light emitting particles dispersed therein, positioned on a window within the vehicle compartment;
a primary graphic projection device for generating a first set of images upon the window of the vehicle based on visible light, wherein the first set of images are displayed upon a primary area of the window;
a secondary graphic projection device for generating a second set of images upon a secondary area the window of the vehicle based on an excitation light, wherein the light emitting particles in the window emit visible light in response to absorbing the excitation light, and wherein the first set of images displayed upon the primary area of the window cooperate with the second set of images displayed upon the secondary area of the window to create an edge-to-edge augmented reality view of a surrounding environment of the vehicle;
a primary graphics processing unit in electronic communication with the primary graphic projection device and the system controller; and
a secondary graphics processing unit in electronic communication with the secondary graphic projection device and the system controller.

19. The system of claim 18, wherein the system is selectively moveable vertically up and down along a vertical central axis, the first display and the first reflector are unitarily and selectively rotatable about the vertical central axis, and the second display and the second reflector are unitarily and selectively rotatable about the vertical central axis;

the system further including:
- first sensors adapted to monitor a position of a head and eyes of the first passenger, wherein, the first display and first reflector are adapted to rotate in response to movement of the head and eyes of the first passenger, and second sensors adapted to monitor a position of a head and eyes of the second passenger, wherein, the second display and the second reflector are adapted to rotate in response to movement of the head and eyes of the second passenger, the system adapted to move up and down along the vertical axis in response to movement of the head and eyes of the first passenger and movement of the head and eyes of the second passenger; and
- a first gesture sensor adapted to gather information related to gestures made by the first passenger, and a second gesture sensor adapted to gather information related to gestures made by the second passenger, wherein, the system is adapted to receive input from the first and second passengers via data collected by the first and second gesture sensors.

20. A method of using a system for generating a centrally located floating three-dimensional image display for a plurality of passengers positioned within a vehicle compartment within a vehicle, comprising:
- displaying, with a first display of an image chamber in communication with a system controller, a first image;
- receiving, with a first reflector individually associated with a first passenger, the first image from the first display;
- reflecting, with the first reflector, the first image to the first passenger, wherein the first passenger perceives the first image floating at a central location within the image chamber;
- displaying, with a second display of the image chamber in communication with a system controller, a second image;
- receiving, with a second reflector individually associated with a second passenger, the second image from the second display;
- reflecting, with the second reflector, the second image to the second passenger, wherein the second passenger perceives the second image floating at the central location within the image chamber;
- displaying, with a transparent display in communication with the system controller and positioned between eyes of the first passenger and the first reflector and between the eyes of the second passenger and the second reflector, first private information to the first passenger within an image plane positioned in front of the first image floating at the central location within the image chamber and second private information to the second passenger within an image plane positioned in front of the second image floating at the central location within the image chamber;
- receiving, with the system controller, via the transparent display, input from the first passenger and the second passenger;
- receiving, with the system controller, via at least one first sensor, input comprising a position of a head and eyes of the first passenger;
- receiving, with the system controller, via at least one first gesture sensor, information related to gestures made by the first passenger;
- collecting, with the system controller, via a first microphone, audio input from the first passenger;
- broadcasting, with the system controller, via a first zonal speaker, audio output for the first passenger;
- collecting, with the system controller, via a second microphone, audio input from the second passenger; and
- broadcasting, with the system controller, via a second zonal speaker, audio output for the second passenger
- collecting, with an external scene camera, images of an external environment outside the vehicle compartment;
- collecting, with an internal scene camera, images of the augmented reality display; and
- displaying, with an augmented reality display in communication with the system controller and having a transparent substrate, having light emitting particles dispersed therein, positioned on a window within the vehicle compartment, general information related to at least one of the first image, the second image, the first and second private information displayed on the transparent display and the input received from the first passenger and the second passenger by:
  - generating, with a primary graphic projection device in communication with the system controller, a first set of images upon the window within the vehicle compartment based on visible light, wherein the first set of images are displayed upon a primary area of the window; and
- generating, with a secondary graphic projection device in communication with the system controller, a second set of images upon a secondary area of the window based on an excitation light, wherein the light emitting particles in the windscreen emit visible light in response to absorbing the excitation light, and wherein the first set of images displayed upon the primary area of the windscreen cooperate with the second set of images displayed upon the secondary area of the windscreen to create an edge-to-edge augmented reality image.

* * * * *